(12) United States Patent
Kannajosyula et al.

(10) Patent No.: US 10,641,743 B2
(45) Date of Patent: May 5, 2020

(54) BEAM FORMING AND STEERING OF HELICAL GUIDED WAVES IN PIPE-LIKE AND PLATE-LIKE STRUCTURES

(71) Applicant: QI2 Elements, LLC, Kent, WA (US)

(72) Inventors: Haraprasad Kannajosyula, Seattle, WA (US); Giovanni Nino, Issaquah, WA (US); Phillip D. Bondurant, Covington, WA (US); Vincent Fratello, Bellevue, WA (US)

(73) Assignee: Q12 Elements, LLC, Kent, WA (US)

( * ) Notice: Subject to any disclaimer, the term of this patent is extended or adjusted under 35 U.S.C. 154(b) by 329 days.

(21) Appl. No.: 15/322,064

(22) PCT Filed: Jun. 24, 2015

(86) PCT No.: PCT/US2015/037376
§ 371 (c)(1),
(2) Date: Dec. 23, 2016

(87) PCT Pub. No.: WO2015/200457
PCT Pub. Date: Dec. 30, 2015

(65) Prior Publication Data
US 2017/0131242 A1    May 11, 2017

Related U.S. Application Data

(60) Provisional application No. 62/016,569, filed on Jun. 24, 2014.

(51) Int. Cl.
| | | |
|---|---|---|
| G01N 29/26 | (2006.01) | |
| G01N 29/11 | (2006.01) | |
| G01N 29/04 | (2006.01) | |

(52) U.S. Cl.
CPC .......... *G01N 29/262* (2013.01); *G01N 29/04* (2013.01); *G01N 29/11* (2013.01);
(Continued)

(58) Field of Classification Search
None
See application file for complete search history.

(56) References Cited

U.S. PATENT DOCUMENTS

| | | |
|---|---|---|
| 3,186,216 A | 6/1965 | Dickinson, III |
| 3,299,694 A | 1/1967 | Dickinson |

(Continued)

OTHER PUBLICATIONS

International Search Report and Written Opinion dated Sep. 23, 2015, issued in corresponding International Application No. PCT/US2015/037376, filed Jun. 24, 2015, 10 pages.

(Continued)

*Primary Examiner* — Roy Y Yi
*Assistant Examiner* — Geoffrey T Evans
(74) *Attorney, Agent, or Firm* — Christensen O'Connor Johnson Kindness PLLC

(57) ABSTRACT

A method of inspecting a pipe for flaws includes emitting ultrasonic waves, controlling the emission of the ultrasonic waves, receiving reflections of the ultrasonic waves, and determining at least one characteristic of one or more flaws. The ultrasonic waves are emitted in a helical pattern through the pipe from an array of ultrasonic transducer elements. The emission of the ultrasonic waves from the array is controlled such that the ultrasonic waves are emitted at a plurality of helical angles within a range of helical angles. The reflections of the ultrasonic waves are caused by impingement of the ultrasonic waves on the one or more flaws. The at least one characteristic of the one or more flaws is determined based on the received reflections of the ultrasonic waves.

24 Claims, 21 Drawing Sheets

(52) U.S. Cl.
CPC .. *G01N 2291/011* (2013.01); *G01N 2291/014* (2013.01); *G01N 2291/044* (2013.01); *G01N 2291/0425* (2013.01); *G01N 2291/106* (2013.01); *G01N 2291/2634* (2013.01)

(56) References Cited

U.S. PATENT DOCUMENTS

| | | | |
|---|---|---|---|
| 4,545,250 A | 10/1985 | Miwa | |
| 4,662,222 A | 5/1987 | Johnson | |
| 5,392,652 A | 2/1995 | Levesque et al. | |
| 6,127,904 A | 10/2000 | Tanaka et al. | |
| 7,529,152 B2 * | 5/2009 | Sinha | G01V 1/50 367/25 |
| 7,652,950 B2 * | 1/2010 | Sinha | G01V 1/50 367/31 |
| 8,818,746 B1 * | 8/2014 | Johnson | G01N 29/045 702/190 |
| 2008/0289424 A1 | 11/2008 | Venczel | |
| 2009/0151457 A1 | 6/2009 | Iizuka | |
| 2010/0212429 A1 | 8/2010 | Isobe et al. | |
| 2011/0087444 A1 | 4/2011 | Volker | |
| 2012/0213036 A1 | 8/2012 | Busch | |
| 2013/0197824 A1 | 8/2013 | Baba et al. | |
| 2014/0278193 A1 * | 9/2014 | Breon | G06F 15/00 702/113 |

OTHER PUBLICATIONS

International Preliminary Report on Patentability dated Dec. 27, 2016, issued in corresponding International Application No. PCT/US2015/037376, filed Jun. 24, 2015, 8 pages.

* cited by examiner

BEAM FORMING AND STEERING OF HELICAL GUIDED WAVES IN PIPE-LIKE AND PLATE-LIKE STRUCTURES

CROSS-REFERENCE(S) TO RELATED APPLICATION(S)

This application claims the benefit of U.S. Provisional Application No. 62/016,569, filed Jun. 24, 2014, the contents of which are incorporated herein by reference in their entirety.

BACKGROUND

Traditional methods employing guided waves for inspecting pipes comprise two stages. The first stage is illustrated in FIG. 1 where a pipe section 20 has an array of transducers 22 mounted over the circumference and an axially propagating guided wave 24. In the first stage, an axially propagating, unfocussed, guided wave is generated by exciting the transducers in the array of transducers 22 simultaneously so that the energy of the wave packet is distributed around the circumference of pipe. This method is limited to detecting flaws that can be attributed to material loss or flaws with circumferential extent (see Hardie F., "Evaluation of the effectiveness of non-destructive testing screening methods for in-service inspection," *Report for the Health and Security Officer*, UK, 2009, pages 29-30).

For the first stage, the disadvantage of traditional methods is that the flaws must necessarily be either material loss type or circumferentially oriented because of the direction of wave propagation. Because the energy of the wave is distributed throughout the circumference, the intensity of the wave is low leading to its premature dissipation when pipe is carrying fluid or is submerged or buried (see Hardie F, "Evaluation of the effectiveness of non-destructive testing screening methods for in-service inspection," *Report for the Health and Security Officer*, UK, 2009, pages 29-30).

The second stage can overcome the limitations of the first stage by providing high intensity ultrasound at the region of interest. The second stage is illustrated in FIG. 2 where a pipe section 26 has an array of transducers 28 mounted over the circumference. A focused waveguide 30 that focuses rays 32 emitted from the array of transducers 28 just before the focal point. One of the disadvantages of the focusing method, when compared to the unfocused guided wave method, is that the inspection is point-by-point which, can be time consuming. The time required for capture can be on the order of 1 ms or more per point for the best case scenario (see, e.g., Li, J. et al "Angular-profile tuning of guided waves in hollow cylinders using a circumferential phased array," *Ultrasonics, Ferroelectrics and Frequency Control, IEEE Transactions on* 49.12, 2002, pages 1720-1729; see also, e.g., Sun, Z. et al., "Flexural torsional guided wave mechanics and focusing in pipe," *Journal of pressure vessel technology* 127.4, 2005, pages 471-478).

Focusing is typically achieved by actuating the array of sensors with time delayed signals through a system, such as the embodiment of a system depicted in FIG. 3. The system includes an ultrasonic transducer array 34 mounted on a pipe, a multichannel preamplifier 36 that receives rays emitted by the ultrasonic transducer array 34, a multichannel analog to digital converter 38, and a computer/controller 40. The system also includes a pulse generator 42 controlled by the computer/controller 40 with variable time delays, amplitudes, frequencies and cycles across the channels. Control signals are sent from the pulse generator 42 to the ultrasonic transducer array 34 to control the emission of rays from the ultrasonic transducer array 34. The system also optionally includes an ultrasonic receiver array 44 mounted on the pipe.

Other disadvantages of the focusing method relate to factors involving the hardware depicted in FIG. 3, such as latency of the hardware when settings are changed to shift the point of focus. The circumferential location of the focal point is changed by switching the order in which the transducer array elements are excited (see Sun, Z. et al., "Flexural torsional guided wave mechanics and focusing in pipe," *Journal of pressure vessel technology* 127.4, 2005, pages 1724 and 1727). Another disadvantage to the guided wave focusing method is the limited a circumferential resolution based on the number of elements in the array. Another disadvantage of the traditional focusing method that can be deduced from literature is that it is most sensitive to flaws that have a circumferential extent because the focused beam is formed by symmetric contribution from all the transducers, as illustrated by the rays 32 depicted in FIG. 2.

The second stage is typically used to size and find the circumferential location of the flaw. Focused guided waves can also be optionally used to generate a C-scan or a detailed map of a pipe by inspecting it point-by-point as the focal point of the wave axially and circumferentially shifted by manipulating the transducer elements' excitation.

All of the above methods are ineffective when there are two flaws with one flaw hidden behind the shadow of another, as illustrated in FIG. 4. In FIG. 4, a pipe 46 includes a transducer array 48 that produce incident rays 50 corresponding to the focused guided wave generated by the transducer array 48 in the pipe 46. The pipe includes a first flaw 54 and a second flaw 56. The first flaw 54 is bigger than the second flaw 56 and the second flaw is located in a shadow of the first flaw 54. The incident rays 50 are reflected by the first flaw 54 and reflection rays 52 return away from the first flaw 54. The first flaw 54 is larger than the second flaw 56 and the second flaw 56 is located in a shadow of the first flaw 54. As a result, as shown in FIG. 4, the incident rays 50 and the reflection rays 52 not hit the second flaw 56 and the second flaw 56 cannot be detected.

Mixing of the ultrasound array parameters, namely, time delays and amplitude variation is known as apodization. Apodization has been suggested in literature as a method for improving spot size of the focused waves. The primary aim of apodization thus far has been to reduce the so called Fourier noise caused due to the finite geometrical extent of an array of transducers. Further, apodization is performed without taking into account the fact that the minimum time delay offered by hardware limits the frequency at which good quality beam forming is achieved. Recently, it was shown that time delays can be completely replaced by amplitude variation across the transducer elements (see Kannajosyula, H., et al., "Amplitude controlled array transducers for mode selection and beam steering of guided waves in plates," *Review of Progress in Quantitative Nondestructive Evaluation: Volume* 32, American Institute of Physics, 2013).

By virtue of the principle of reciprocity, theories developed for beam steering have enabled the development of post-processing algorithms in literature for tools that employ an array of ultrasonic sensors each of which discretely transmit and/or receive ultrasonic guided wave signals in the structure. Such post-processing algorithms are able to filter flaw signatures from the received data and thereby image the structure. Such algorithms are commonly referred to as synthetic phased array method and tools employing such algorithms have been referred to as ultrasonic radar or ultrasonic guided wave radar.

Unfocused beam forming in plates has been shown to be possible (see, e.g., Kannajosyula, H., et al., "Amplitude controlled array transducers for mode selection and beam steering of guided waves in plates," *Review of Progress in Quantitative Nondestructive Evaluation: Volume* 32, American Institute of Physics. 2013). In principle, wave propagation in a pipe of very large diameter and small wall thickness will be similar to that in a plate. However, this may not necessarily be true for pipes of smaller diameters. Hence extension of beam forming technique used in plates to beam forming in pipes is not straightforward. Conversely, a method for focused beam forming in plates has not yet been developed in literature. Theory used for pipes can be extended to plates by modeling plates as very large diameter pipes. However; current theory appears to need further development for this to be possible.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method of inspecting a pipe for flaws includes emitting ultrasonic waves, controlling the emission of the ultrasonic waves, receiving reflections of the ultrasonic waves, and determining at least one characteristic of one or more flaws. The ultrasonic waves are emitted in a helical pattern through the pipe from an array of ultrasonic transducer elements. The emission of the ultrasonic waves from the array is controlled such that the ultrasonic waves are emitted at a plurality of helical angles within a range of helical angles. The reflections of the ultrasonic waves are caused by impingement of the ultrasonic waves on the one or more flaws. The at least one characteristic of the one or more flaws is determined based on the received reflections of the ultrasonic waves.

In one example, the at least one characteristic of the one or more flaws includes one or more of a location of the one or more flaws, a size of the one or more flaws, an orientation of the one or more flaws, or a shape of the one or more flaws. In another example, the at least one characteristic of the one or more flaws is determined based on a presence or an absence of an anomalous signature. In another example, the method further includes mapping the at least one characteristic based on at least one of an amplitude distribution in time, an amplitude distribution in frequency, arrival time, or direction of approach of the anomalous signature. In another example, the method further includes controlling one or more of an average value of the range of helical angles or a width of the range of helical angles.

In another embodiment, a device for inspecting a structure for flaws includes at least one ultrasonic emitter configured to emit waves in the structure, at least one ultrasonic receiver configured to receive reflections of the waves caused by impingement of the waves on one or more flaws, and a computing system. The a computing system is configured to control emission of waves from the at least one ultrasonic transducer in helical patterns based on one or more control parameters and determine at least one characteristic of one or more flaws in the structure based on the signals emitted from the array and the reflections of the waves received by the array. The one or more control parameters includes at least a windowed pulsed signal comprising at least a half oscillation of any shape.

In one example, the one or more control parameters further includes at least one of: a continuous oscillation of signal amplitudes, a variance of signal frequency over time, a prescribed range of frequencies, or a variance of one or more of time delays, amplitudes, number cycles, pulse lengths, or frequencies. In another example, the device further includes an array comprising the at least one ultrasonic emitter and the at least one ultrasonic receiver. In another example, the device further includes at least one additional ultrasonic receiver configured to receive one or more of the waves emitted by the array or the reflections of the waves, where the at least one additional ultrasonic receiver is separate from the array. In another example, the computing system is further configured to determine the at least one characteristic of the one or more flaws based on the characteristics of reflected or transmission of waves received by the at least one additional ultrasonic receiver. In yet another example, the computing system is configured to evaluate and select one or more of a guided wave subtype of the waves, helical paths of the waves, or a focal point of the waves.

In another example, the structure is a pipe. In another example, the pipe comprises at least one of a circular cross-section, a square cross-section, a triangular cross-section, any other polygonal cross-section, or a cross-section that rotates along an axis of the pipe. In another example, at least one emitter is configured to emit omnidirectional waves, where at least one ultrasonic transducer element comprises the at least one ultrasonic emitter and the at least one ultrasonic receiver, and where the at least one ultrasonic transducer element is in a configuration determined by a direction of oscillation relative to waves propagating in the pipe or to an axis of the pipe.

In another example, the oscillation is along a thickness of the pipe, where the at least one ultrasonic transducer element is a thickness mode piezoelectric transducer or a particularly-shaped 1-3 piezo-composite transducer. In another example, the oscillation is along the axis of the pipe, where the at least one ultrasonic transducer element is a circular-shaped macro-fiber composite with piezoelectric fibers oriented perpendicular to the axis and comprises electrodes arranged along the axis of the pipe. In another example, the oscillation is tangential and orthogonal to the axis of the pipe, where the at least one ultrasonic transducer element is a circular-shaped macro-fiber composite with piezoelectric fibers oriented perpendicular to the axis and comprises electrodes arranged perpendicular to the axis of the pipe. In another example, the oscillation is tangential and orthogonal to the waves, where the at least one ultrasonic transducer element is a circular-shaped macro-fiber composite with piezoelectric fibers forming an annular array and comprises electrodes oriented radially from the center of the annular array. In another example, the oscillation is tangential and parallel to the waves, where the at least one ultrasonic transducer element comprises electrodes forming an annular array, and where the at least one ultrasonic transducer element is a circular-shaped macro-fiber composite with piezoelectric fibers oriented radially from the center of the annular array.

In another example, the at least one ultrasonic emitter is configured to emit waves both unidirectionally and bidirectionally. In another example, the structure comprises a plate-like structure. In another example, the computing system is further configured to determine at least one characteristic of one or more flaws in the structure based at least in part on the following formula:

$$\Phi = \phi \Xi_\alpha$$

$$\begin{bmatrix} \Psi_r \\ \Psi_\theta \\ \Psi_z \end{bmatrix} = \begin{bmatrix} \psi_{T1} & \psi_{T2} & 0 \\ -\psi_{T2} & \psi_{T1} & 0 \\ 0 & 0 & \psi_z \end{bmatrix} \begin{bmatrix} \partial \Xi_\beta / \partial r \\ \frac{1}{r} \frac{\partial \Xi_\beta}{\partial \theta} \\ \Xi_\beta \end{bmatrix}$$

where $\Phi$ is a Helmholtz scalar potential, where $\Psi_r$, $\Psi_\theta$ and $\Psi_z$ are components of a Helmholtz vector potential, where $\phi$, $\psi_{Tj}$; j=1, 2 and $\psi_z$ are arbitrary constants, and where $\Xi_\eta$, $\eta=\alpha,\beta$ is a function of the form exp i($\eta r \cos(\theta-\theta_n)+k_z z-\omega t$). In another example, the computing system is further configured to determine at least one characteristic of one or more flaws in the structure based at least in part a time delay supplemented by amplitude control based on a minimum time delay increment, and the minimum time delay is a characteristic of hardware in the device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

This subject matter disclosed herein relates to systems and methods for unfocussed and focused beam forming and steering of ultrasonic helical guided waves in pipe- and plate-like structures. In one embodiment, a pipe-like structure is approximated as a perfectly circular cylinder that is constructed out of metal, plastic, or inhomogeneous materials of some regularity, as exemplified by carbon fiber reinforced polymer (CFRP) composite. Beam forming and steering of ultrasonic helical guided waves is possible due to formulating guided waves in pipes that provides improved understanding of the phenomena. In one embodiment, a system and method directs guided waves along a specific helical angle providing significant advantages over previous systems and methods.

Figure 3:
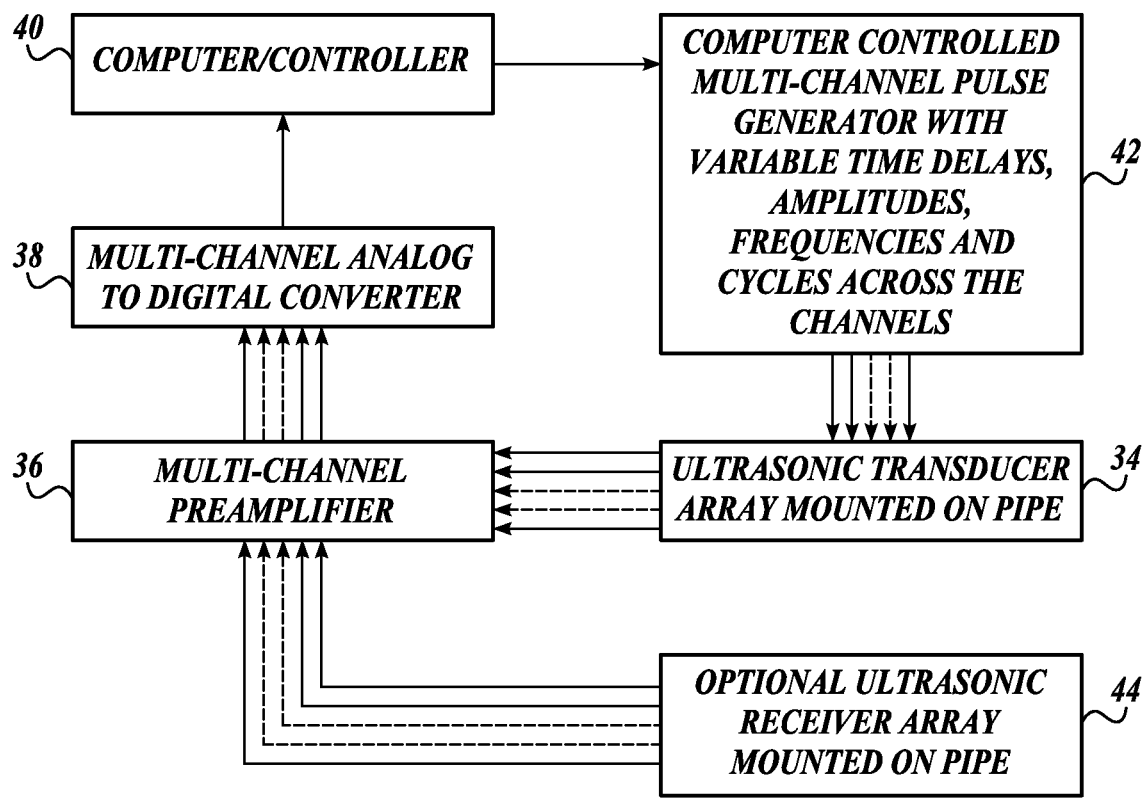
FIG. 3 depicts an embodiment of a schematic of a system used for beam forming and steering.
Figure 4:
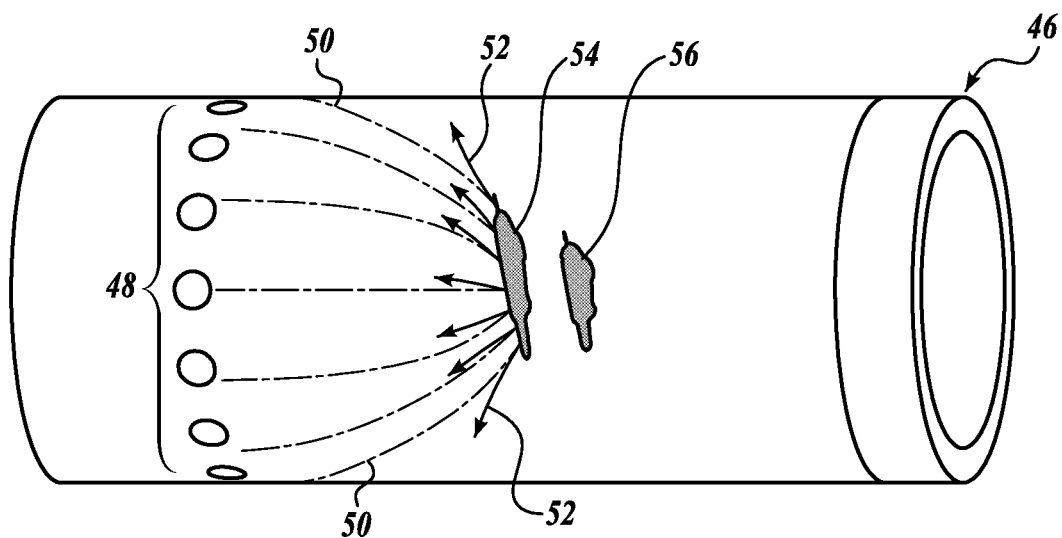
FIG. 4 depicts an embodiment a structure with two flaws and how a second flaw occurring in the shadow of a first, bigger flaw may not be detected by traditional focused beam forming.
Figure 5:
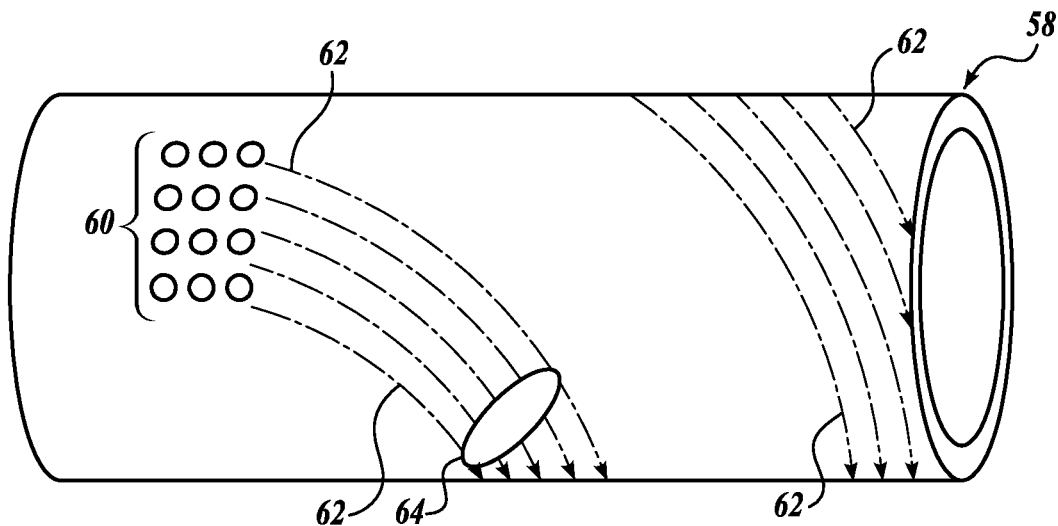
FIG. 5 depicts an embodiment of unfocused beam forming and steering of helical guided waves.

The concept of unfocussed beam forming and steering is illustrated in FIG. 5, where a pipe 58 includes a transducer array 60 configured to emit rays 62 aligned along a helix over the wall of the pipe 58. A beam 64 of guided waves is generated by controlling the actuation of the transducer array 60 on the pipe 58 such that the rays 62 are aligned along a helix over the wall of the pipe 58. In one embodiment, control of the actuation of the transducer array 60 is achieved by a method described later with respect to FIG. 7 using a system, such as the example system depicted in FIG. 3.

Figure 6:
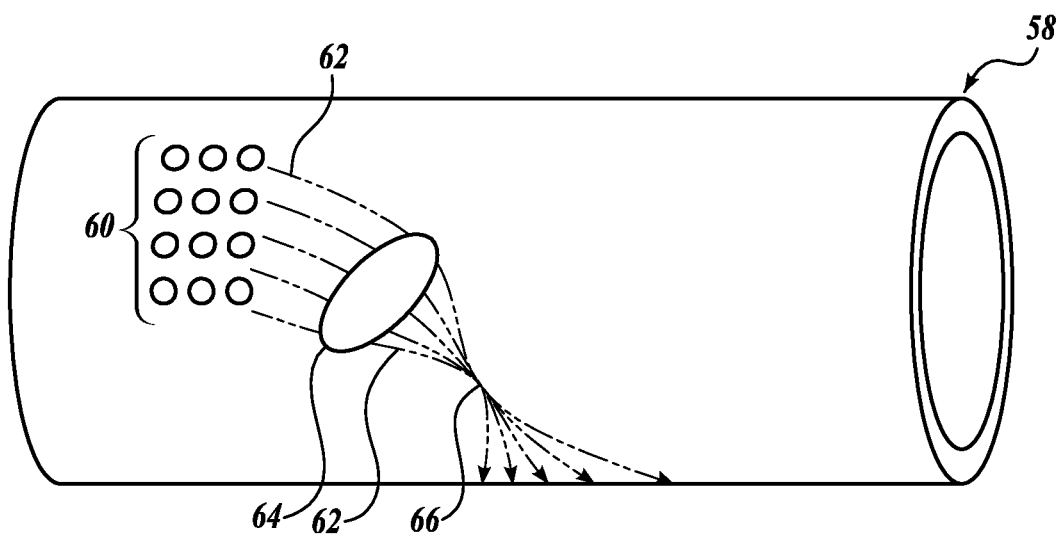
FIG. 6 depicts an embodiment of focused beam forming of helical guided waves with an eccentric focal point.

The concept of focused beam forming is illustrated in FIG. 6, where a beam of guided waves 64 is generated in the pipe 58 so that the beam comprising helical rays 62 that converge at a focal point 66. In one embodiment, the focal point 66 is located off the axes of the transducer array 60 by controlling the actuation of the transducer array 60. The actuation control in this case is achieved by method described later with respect to FIG. 8 using a system, such as the example system depicted in FIG. 3.

Figure 7:
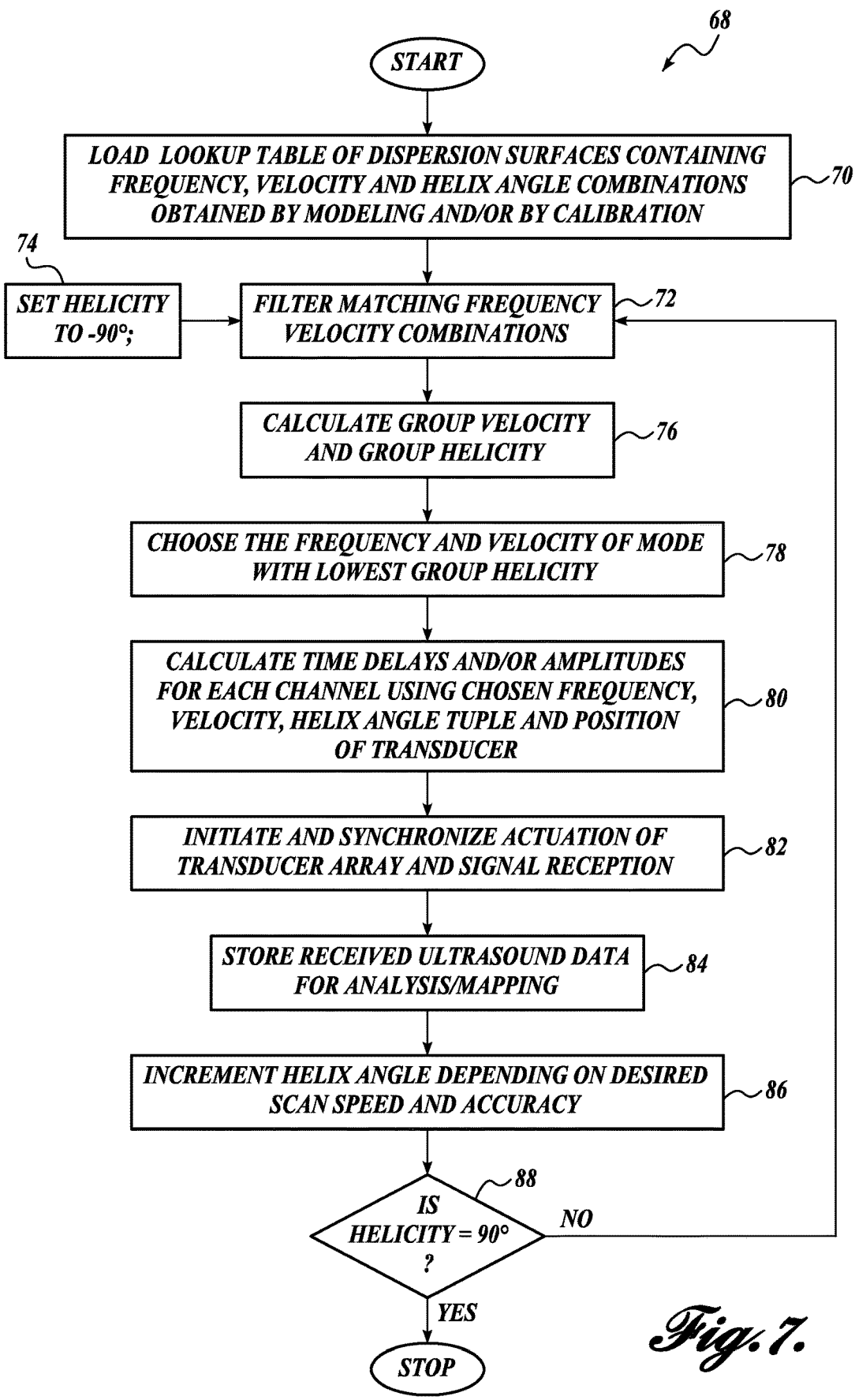
FIG. 7 depicts an embodiment of a method for achieving unfocused beam forming and steering.

An example method 68 of controlling actuation of the transducer array for unfocussed beam forming and steering is depicted in FIG. 7. After the method 68 starts, at block 70, a lookup table of dispersion surfaces is loaded. The lookup table includes frequency, velocity, and helix angle combinations obtained by modeling and/or calibration. At block 72, matching frequency velocity combinations are filtered. Optionally, at block 74, the helicity can be set at an initial helix angle, such as −90°. At block 76, a group velocity and a group helicity are calculated. At block 78, a frequency and velocity of mode with the lowest group helicity are chosen. At block 80, time delays and/or amplitudes for each channel are calculated using the chosen frequency, velocity, helix angle tuple and/or position of transducer. At block 82, actuation of the transducer array and signal reception are initiated and synchronized. At block 84, the received ultrasound data is stored for analysis and/or mapping. At block 86, the helix angle is incremented. In one embodiment, the helix angle is incremented based on a desired scan speed and accuracy. At block 88, a determination is made whether the incremented helicity has reached a final helix angle, such as 90°. If the incremented helicity has not reached the final helix angle, the method 68 returns to block 72 and repeats steps 72 to 86 for the incremented helicity. However, if the incremented helicity has reached the final helix angle, then the method 68 ends.

Figure 8:
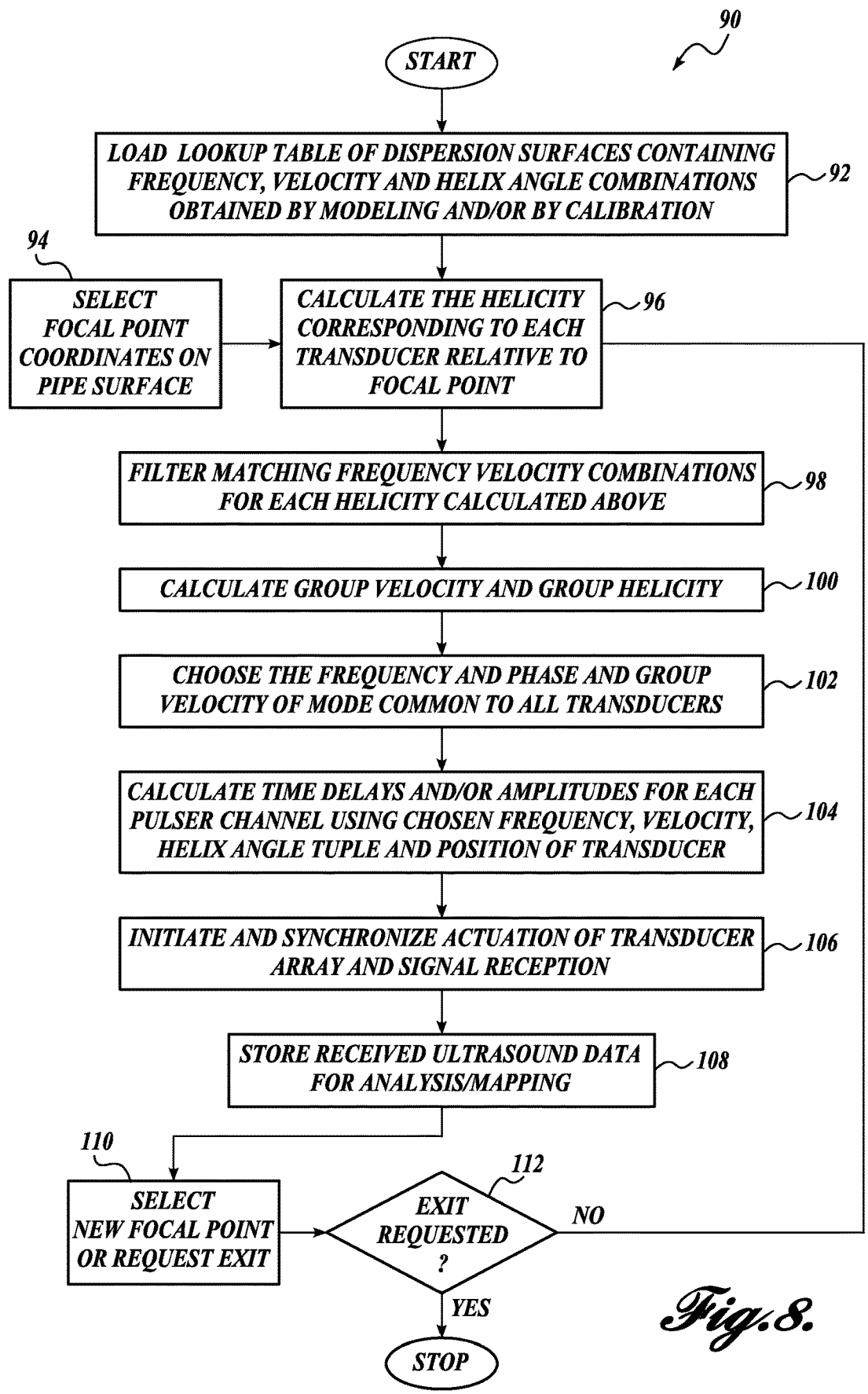
FIG. 8 depicts an embodiment of a method for achieving for focused beam forming at an eccentric focal point.

An example method 90 of controlling actuation of the transducer array for focused beam forming is depicted in FIG. 8. After the method 90 starts, at block 92, a lookup table of dispersion surfaces is loaded. The lookup table includes frequency, velocity, and helix angle combinations obtained by modeling and/or calibration. At block 94, selected focal point coordinates on the pipe surface are received. At block 96, the helicity corresponding to each transducer is calculated relative to the focal point. At block 98, the matching frequency velocity combinations for each helicity calculated above are filtered. At block 100, group velocity and group helicity are calculated. At block 102, the frequency, phase, and group velocity of mode common to all transducers are chosen. At block 104, time delays and/or amplitudes are calculated for each pulse channel. In one embodiment, the delays and/or amplitudes are calculated based on the chosen frequency, velocity, helix angle tuple and/or position of the transducers. At block 106, the actuation of the transducer array and the actuation of signal reception are initiated and synchronized. At block 108, the received ultrasound data is stored for analysis and/or mapping. At block 110, a new focal point or an exit request is received. At block 112, if a new focal point is received, then the method 90 returns to block 96 and repeats steps 96 to 110 for the new focal point. However, if an exit request is received, then the method 90 ends.

In general, ultrasonic transmitters do not need to have direct access to load carrying layers if the waves can be generated in the non-load-carrying layers using a given transmitter. For example, in the case of a guided wave phased array transducer, the phased array may be installed on the coated structure (e.g., coated pipe) without removal of the coating layer. The advantage includes not requiring the full removal of the coating layer installation of the transducer array a mandatory practice in conventional methods of installation. This is, in particular, desirable when the full circumference of the pipeline is not accessible. Examples of using phased array transducers are described in U.S. Patent Application No. 62/103,315, filed Jan. 14, 2015, the contents of which are hereby incorporated by reference in their entirety.

In addition, in some embodiments, the subject matter disclosed herein employs mixed time delay and amplitude control to improve beam forming of high frequency ultrasonic guided waves and thereby further improve the resolution of the inspection system. As a departure from traditional apodization methods, the amplitude variation is used to compensate for the lack of precision in the time delays offered by current hardware. In some embodiments, the subject matter disclosed herein may also be used for focused beam forming in plate-like structures. In some embodiments, the subject matter disclosed herein enables non-destructive scanning of pipelines for flaws of any shape and orientation at higher speeds with better resolution and improved accuracy, some of the reasons for which are described in the next section.

Example Advantages of Disclosed Embodiments

Figure 9:
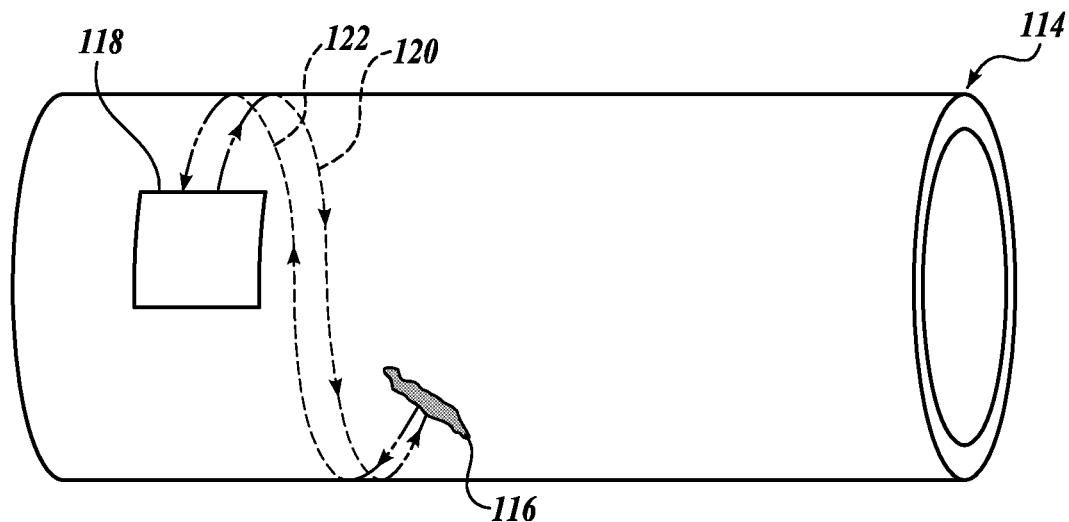
FIG. 9 depicts an embodiment of an application of focused or unfocused beam forming of helical guided waves.

One of the advantages of the subject matter disclosed herein is that flaws of all orientations can be detected, located, and sized simultaneously without necessarily requiring a second stage because of the variable helical path of the guided waves. Because of the variability of helical angles, a given flaw can be interrogated from multiple directions. In some embodiments, the directionality is controlled on demand by a user or a control algorithm. An example of this capability is depicted in FIG. 9, where a pipe 114 has a flaw 116 in the form of an included crack. A transducer array 118 is mounted on the pipe 114. The transducer array 118 is configured to transmit a helical guided wave beam, the path of which is represented by ray 120, so that it impinges on the flaw 116. In the depicted embodiment, the helical guided wave beam impinges on the flaw 116 at an angle that results in a strong helical guided wave beam reflection 122. The transducer array 118 is configured to receive the helical guided wave beam reflection 122.

Figure 1:
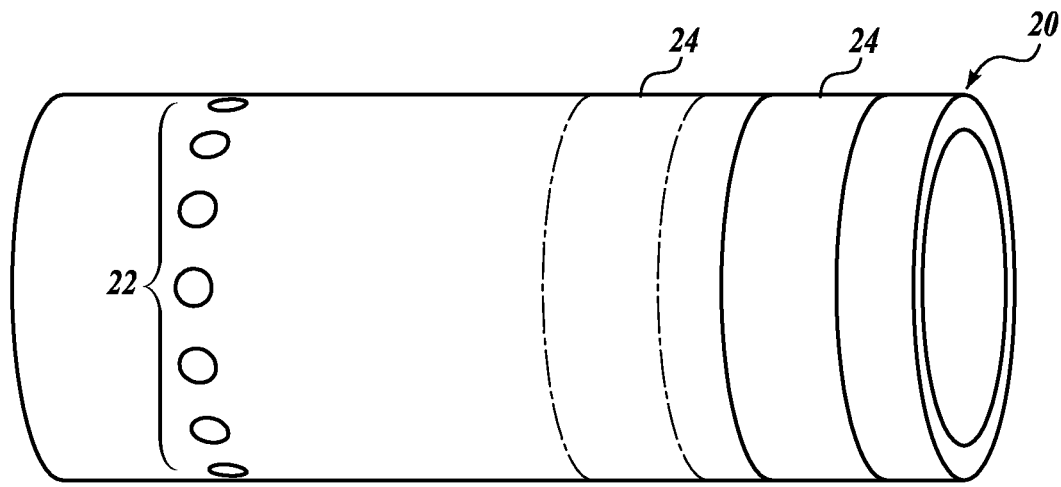
FIG. 1 depicts an embodiment of acoustic phenomenon corresponding to uniform axial guided waves.
Figure 2:
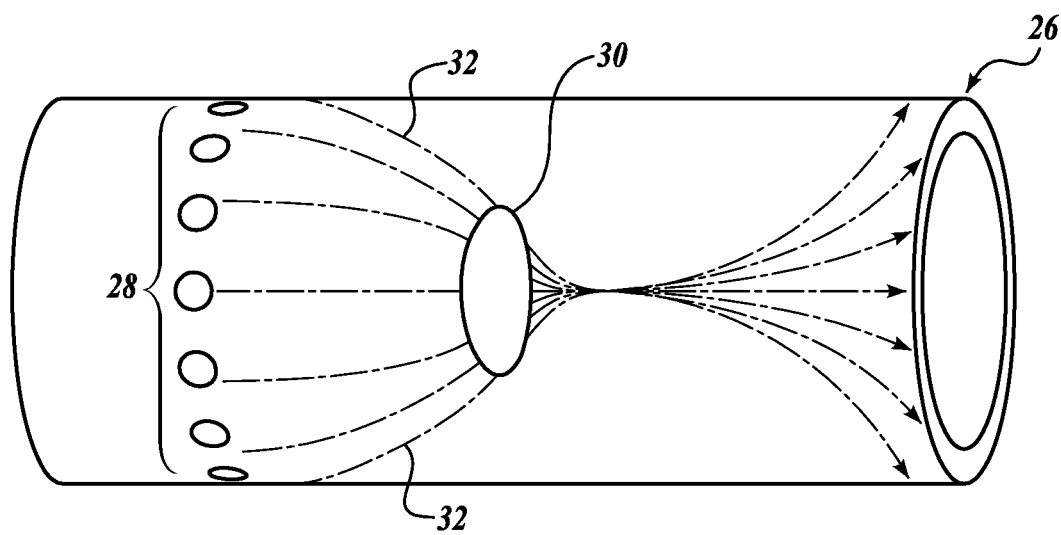
FIG. 2 depicts an embodiment of acoustic phenomenon during traditional focused beam forming.

Further, due to the reasons that apply to the guided wave focusing technique (e.g., namely the constructive interference of ultrasound from multiple transducers), the intensity of the resulting ultrasound will be high when compared to the first stage of the traditional approach depicted in FIG. 1. Further, the scanning can be performed at very high speeds because instead of point by point inspections, the beam-formed wave sweeps long distances as it propagates on a helical path along the pipeline. In situations where the guided waves attenuate heavily, the guided wave beam may be made to focus at an eccentric focal point so that most of advantages of unfocused beam forming and steering are retained while providing high intensities of traditional focusing methods.

Figure 10:
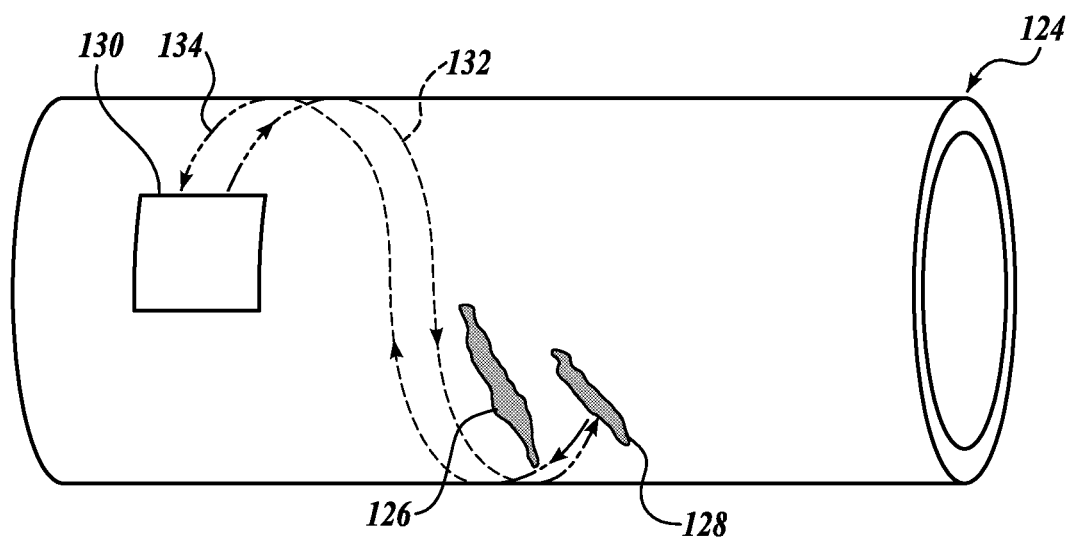
FIG. 10 depicts an embodiment of helical guided waves used to detect and size second flaw occurring in the shadow of a first, bigger flaw.

FIG. 10 depicts an embodiment of helical guided waves used to detect and size second flaw occurring in the shadow of a first, bigger flaw. As illustrated, a pipe 124 includes a first flaw 126 and a second flaw 128. A transducer array 130 is mounted to the pipe 124. The first flaw 126 is larger than the second flaw 128 and the second flaw 128 is in the shadow of the first flaw 126 (i.e., the first flaw 126 is located between the transducer array 130 and the second flaw 128). The transducer array 130 is configured to transmit a focused or unfocused helical guided wave beam, the path of which is represented by ray 132, so that it avoids the first flaw 126 and impinges on the second flaw 128. In the depicted embodiment, the helical guided wave beam impinges on the second flaw 128 at an angle that results in a helical guided wave beam reflection 134. The transducer array 130 is configured to receive the helical guided wave beam reflection 134.

Figure 11:
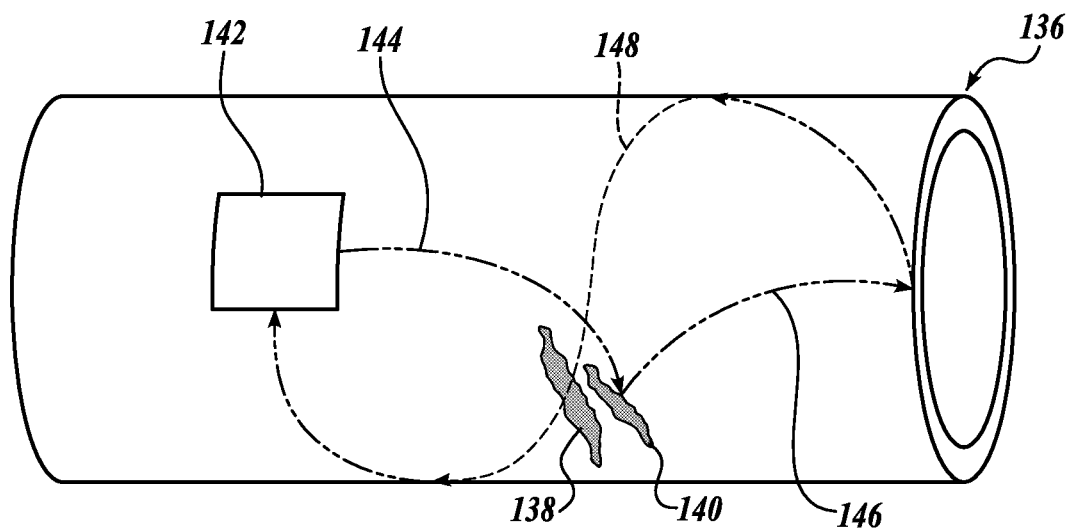
FIG. 11 depicts an embodiment of helical guided waves and edges of pipe used to detect and size second flaw occurring in the shadow of a first, bigger flaw.

The hidden flaw may also be detected by observing signals from that are as a result of multiple reflections, as depicted in FIG. 11. As illustrated, a pipe 136 includes a first flaw 138 and a second flaw 140. A transducer array 142 is mounted to the pipe 136. The first flaw 138 is larger than the second flaw 140 and the second flaw 140 is in the shadow of the first flaw 138. The transducer array 142 is configured to transmit a focused or unfocused helical guided wave beam, the path of which is represented by ray 144, so that it avoids the first flaw 138 and impinges on the second flaw 140. In the depicted embodiment, the helical guided wave beam impinges on the second flaw 140 at an angle that results in a first beam reflection 146. The first beam reflection 146 impinges on an end of the pipe 136 at an angle that results in a second beam reflection 148. The transducer array 142 is configured to receive the second beam reflection 148.

Figure 12:
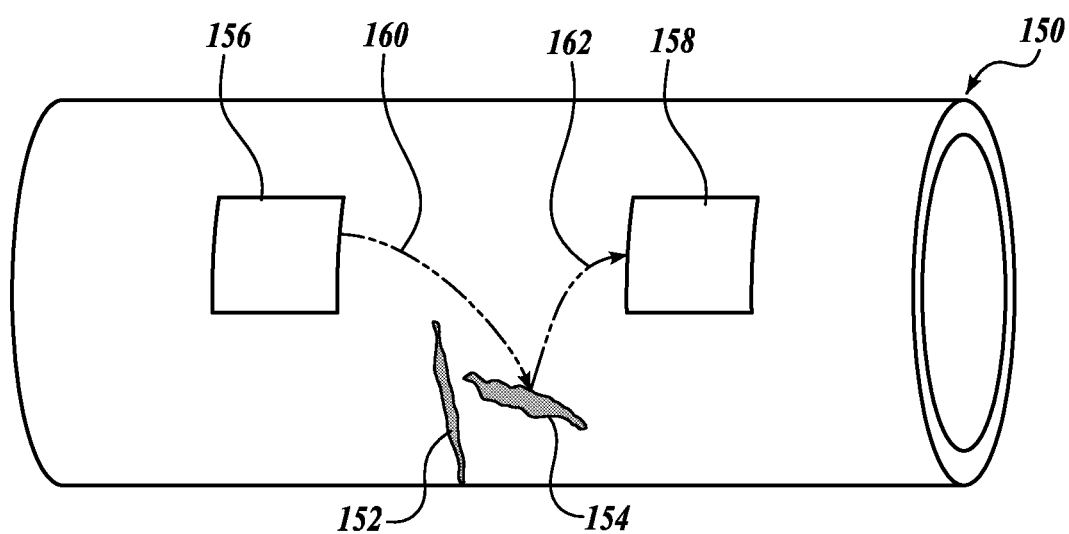
FIG. 12 depicts another embodiment of helical guided waves used to detect and size second flaw occurring in the shadow of a first, bigger flaw.

FIG. 12 depicts another embodiment of helical guided waves used to detect and size second flaw occurring in the shadow of a first, bigger flaw. As illustrated, a pipe 150 includes a first flaw 152 and a second flaw 154. A transducer array 156 and a receiver array 158 are mounted to the pipe 150. The second flaw 154 is in the shadow of the first flaw 152. The transducer array 156 is configured to transmit a focused or unfocused helical guided wave beam, the path of which is represented by ray 160, so that it avoids the first flaw 152 and impinges on the second flaw 154. In the depicted embodiment, the helical guided wave beam impinges on the second flaw 154 at an angle that results in a beam reflection 162. The receiver array 158 is configured to receive the beam reflection 162.

Figure 13:
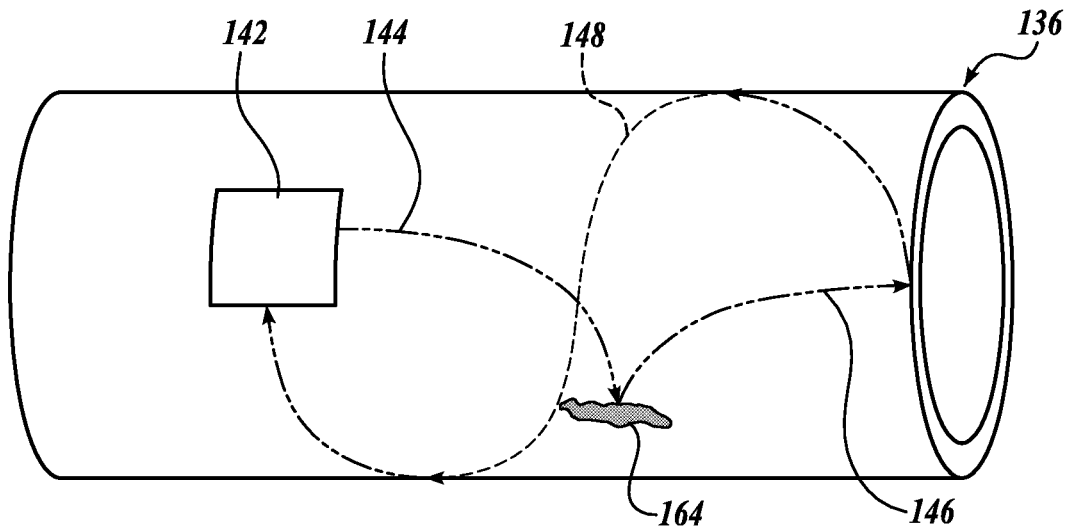
FIG. 13 depicts an embodiment of helical guided waves and edges of pipe used to detect an axially-oriented.
Figure 14:
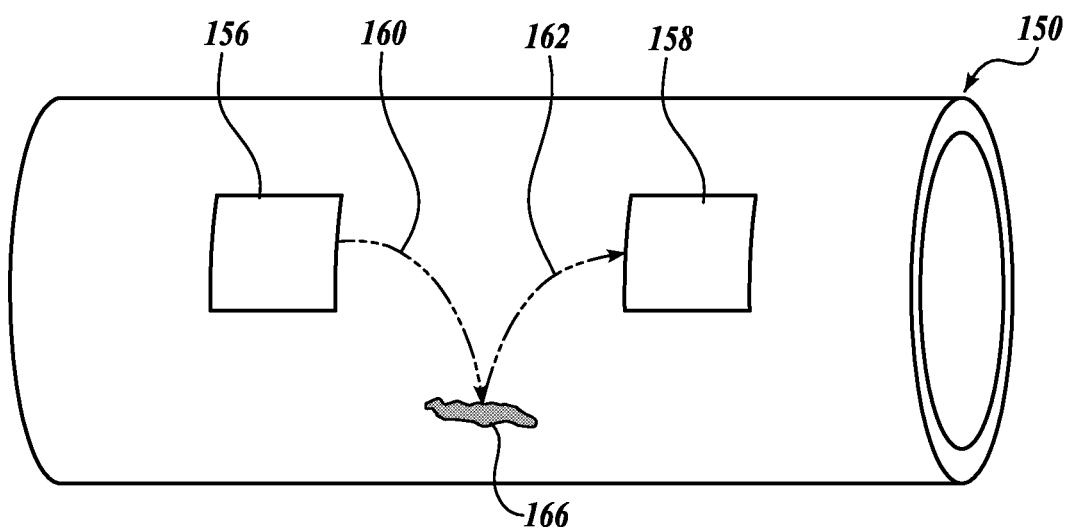
FIG. 14 depicts an embodiment of a transducer arrangement usable to detect a flaw using helical guided waves.

FIGS. 13 and 14 depict, respectively, another embodiment of the pipe 136 from FIG. 11 with an axially-oriented flaw 164 and another embodiment of the pipe 150 from FIG. 12 with an axially-oriented flaw 166. In FIG. 13, the helical guided wave beam, as shown by ray 144, impinges on the axially-oriented flaw 164 at an angle that results in a first beam reflection 146. The first beam reflection 146 impinges on an end of the pipe 136 at an angle that results in a second beam reflection 148. The transducer array 142 is configured to receive the second beam reflection 148. In FIG. 14, the helical guided wave beam, as shown by ray 160, impinges on the axially-oriented flaw 166 at an angle that results in a beam reflection 162. The receiver array 158 is configured to receive the beam reflection 162. In other embodiments, the example shown in FIGS. 13 and 14 are used to other axially-oriented features, such seam and girth welds in pipes. In some embodiments, the systems shown in FIGS. 13 and 14 also have improved resolution due to mixed time and amplitude control.

The guided wave beam generated by this direction will be unidirectional, unlike traditional approaches that are bidirectional. In other words, traditional approaches generate beams in both directions along the axis of the pipe. This may be considered an advantage as the readability of the acquired data is vastly superior because of absence of reflections from features in one or more directions. However, the embodiments disclosed herein can optionally be made to act bidirectionally. In one embodiment, the unidirectional capability is used for detailed sizing and location of flaws after bidirectional capability is used to detected the flaws.

Wave Types and Transducer Designs

Preliminary results indicate that generation of special wave types is possible under certain embodiments. In some embodiments, such waves are generated by particular transducer designs. Some examples of such waves and transducer design are depicted in FIGS. 15 to 22. A condition common to transducer element designs is that transducers generate waves in all directions (i.e., they are omnidirectional). Omnidirectionality may be achieved when the transducer elements are circular in shape and conform to the pipe surface, or when the transducer elements are extremely small so that the liftoff effect due to the pipe's curvature is negligible.

Figure 15A:
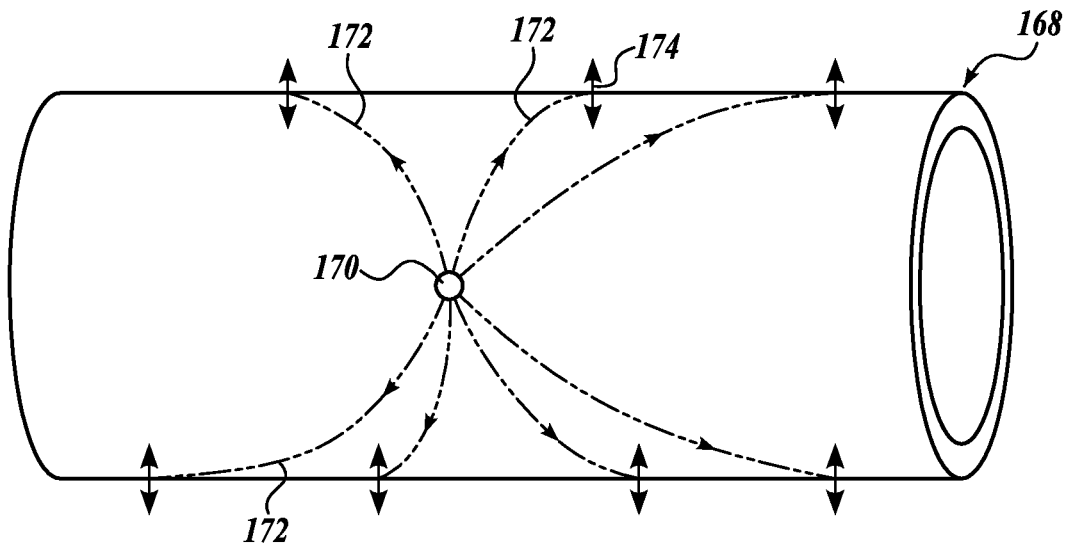
FIGS. 15A and 15B depict, respectively, a side view and an end view of an embodiment of a transducer element that excites omnidirectional guided waves by applying forces along the pipe radius.
Figure 15B:
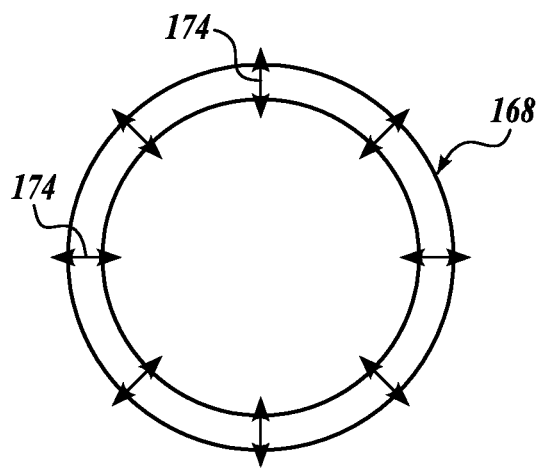

FIGS. 15A and 15B depict, respectively, a side view and an end view of an embodiment of a transducer element that excites omnidirectional guided waves by applying forces along the pipe radius. As depicted, a pipe 168 has a transducer element 170 mounted thereon. The transducer element 170 is configured to emit helical guided waves 172. The helical guided waves 172 cause particle oscillation 174 in a direction normal to the wall thickness of the pipe 168. In this embodiment, the transducer element 170 is a thickness mode transducer that either conforms to the pipe's surface or is small enough that liftoff of the transducer element 170 from the pipe's surface does not affect the ability of the transducer element 170 to generate omnidirectional helical guided waves 172. In one embodiment, the transducer element 170 is a single crystal transducer. This kind of wave is, however, susceptible to leakage when the pipe 168 is submerged in water and even in situations where the pipe 168 is covered with of water only on discrete regions.

Figure 16:
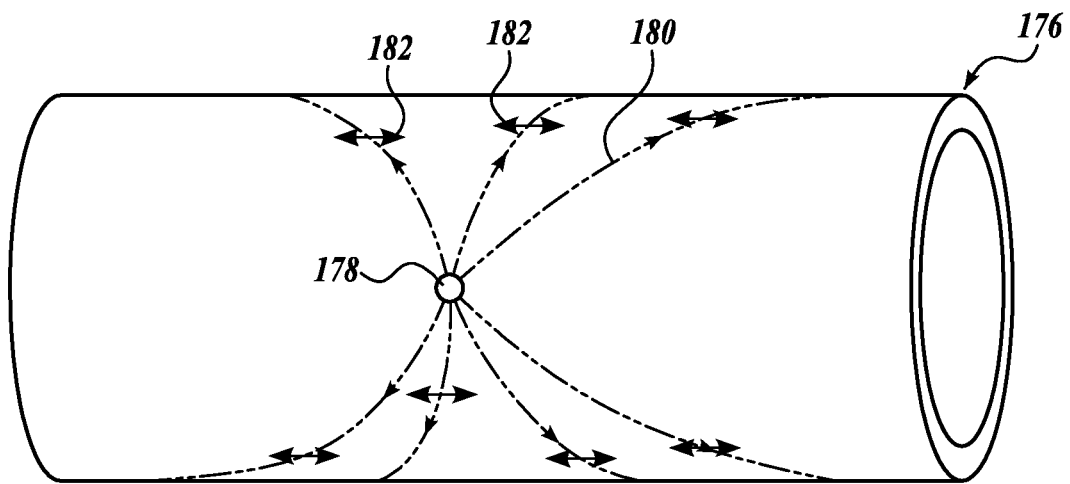
FIG. 16 depicts an embodiment of transducer element actuation where the resulting particle oscillation is axial irrespective of the wave's helix angle.
Figure 17:
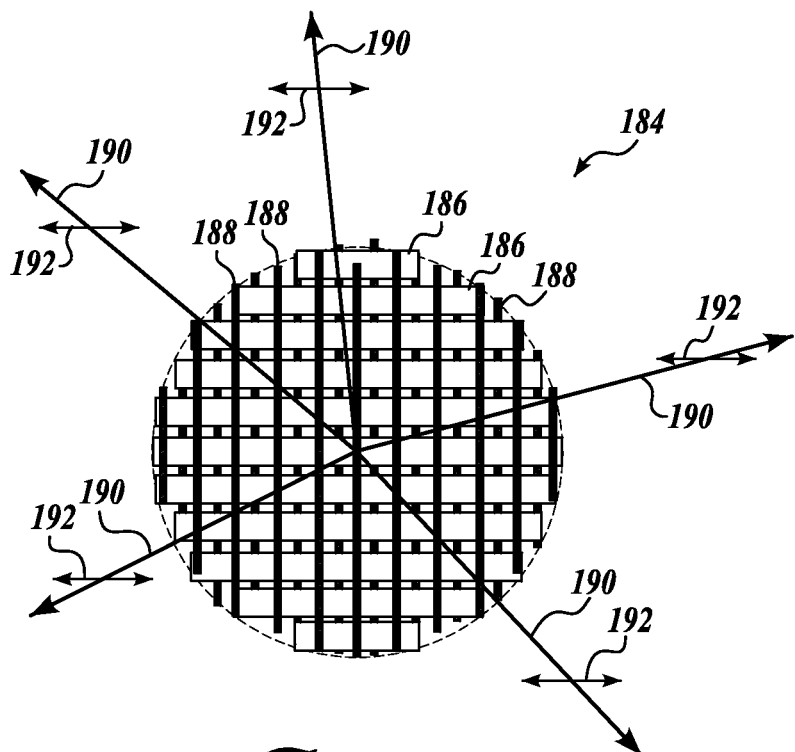
FIG. 17 depicts an embodiment of a macro fiber composite piezoelectric transducer design configured to achieve the guided waves depicted in FIG. 16.

FIG. 16 depicts an embodiment of transducer element actuation where the resulting particle oscillation is axial irrespective of the wave's helix angle. As depicted, a pipe 176 has a transducer element 178 mounted thereon. The transducer element 178 is configured to emit helical guided waves 180. The helical guided waves 180 cause particle oscillation 182 in an axial direction of the pipe 168. In one embodiment, the axial actuation is achieved using a macro fiber composite (MFC) piezoelectric transducer 184 depicted in FIG. 17. As depicted, the MFC piezoelectric transducer 184 includes closely packed piezoelectric fibers 186 and electrical current carrying electrodes 188. The piezoelectric fibers 186 in an MFC elongate when electric current is passed through the electrodes 188. The particle displacement 192 (e.g., particle oscillation 182 in FIG. 16) of the resulting waves 190 (e.g., helical guided waves 180 in FIG. 16) continue to be along the direction that the piezoelectric fibers 186 elongate. The circular pattern of the overall transducer 184 ensures that omnidirectional guided waves 190 (e.g., helical guided waves 180 in FIG. 16) are generated.

Figure 18A:
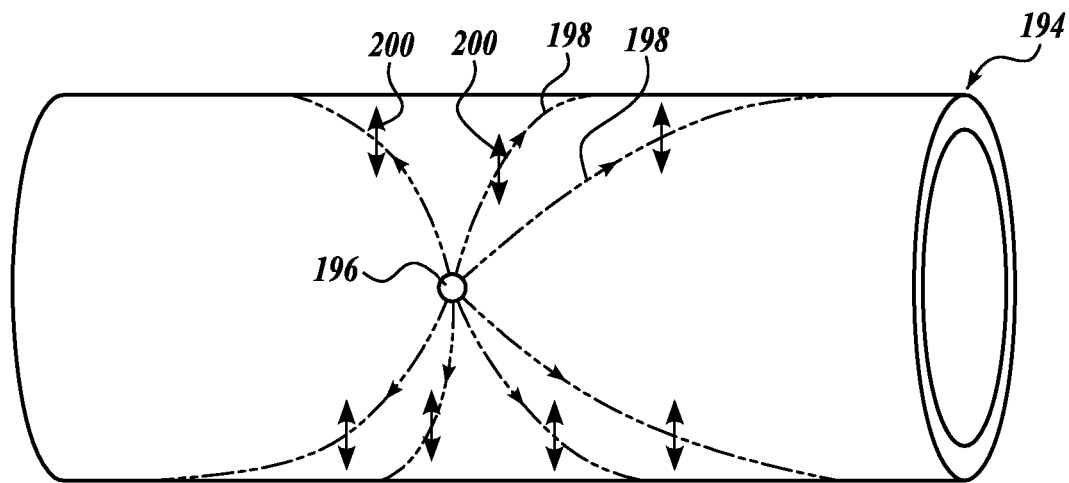
FIGS. 18A and 18B depict a side view and an end view, respectively, of a transducer element with an actuation that results in wave propagation with torsional or circumferential particle oscillation.
Figure 18B:
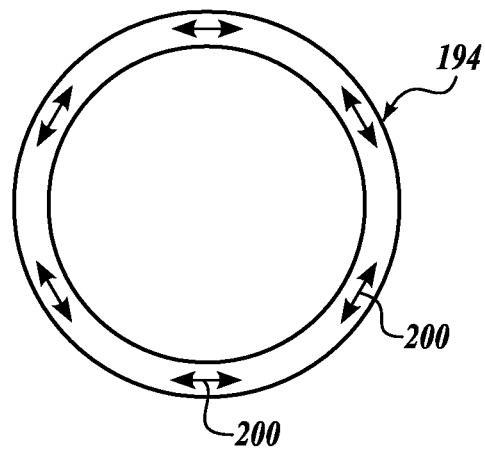

FIGS. 18A and 18B depict a side view and an end view, respectively, of a transducer element with an actuation that results in wave propagation with torsional or circumferential particle oscillation. As depicted, a pipe 194 has a transducer element 196 mounted thereon. The transducer element 196 is configured to emit helical guided waves 198. The helical guided waves 198 cause torsional or circumferential particle oscillation 200. In one example, the embodiment shown in FIGS. 18A and 18B can be achieved using the MFC piezoelectric transducer 184 depicted in FIG. 17 at an angle rotated by about 90° from the orientation of the transducer element 178 depicted in FIG. 16.

Figure 19:
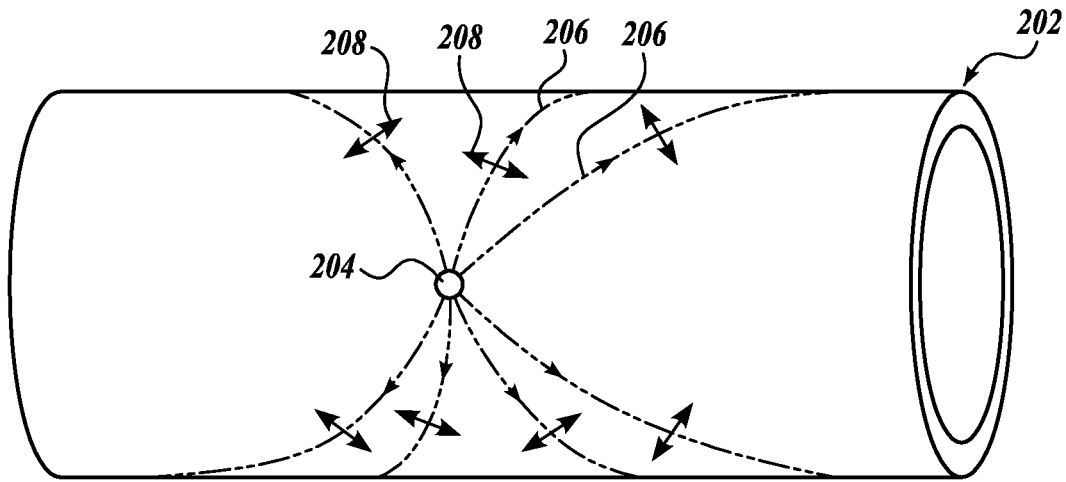
FIG. 19 depicts an embodiment of wave propagation where the particle oscillation is tangential to the pipe but perpendicular to the helix angle of the guided waves generated by the transducer.
Figure 20:
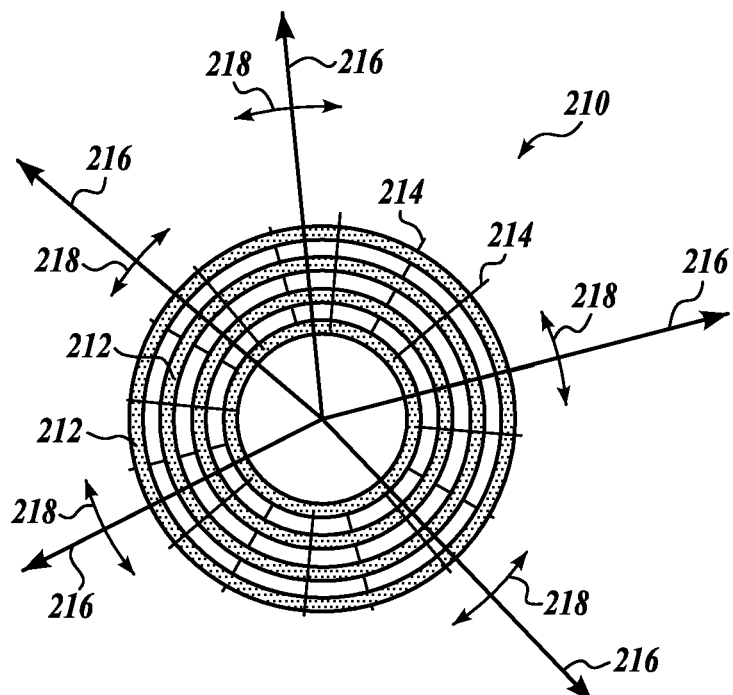
FIG. 20 depicts an embodiment of a macro fiber composite piezoelectric transducer design configured to achieve the guided waves depicted in FIG. 19.

FIG. 19 depicts an embodiment of wave propagation where the particle oscillation is tangential to the pipe but perpendicular to the helix angle of the guided waves generated by the transducer. As depicted, a pipe 202 has a transducer element 204 mounted thereon. The transducer element 204 is configured to emit helical guided waves 206. The helical guided waves 206 cause particle oscillation 208 tangential to the pipe 202 but perpendicular to the helical guided waves 206. In one embodiment, the particle oscillation 208 is achieved using a macro fiber composite (MFC) piezoelectric transducer 210 depicted in FIG. 20. As depicted, the MFC piezoelectric transducer 210 includes closely packed piezoelectric fibers 212 and electrical current carrying electrodes 214. The piezoelectric fibers 212 in an MFC elongate when electric current is passed through the electrodes 214. The particle displacement 218 (e.g., particle oscillation 208 in FIG. 19) of the resulting waves 216 (e.g., helical guided waves 206 in FIG. 19) continue to be along the direction that the piezoelectric fibers 186 elongate (i.e., normal to the resulting waves 216). The circular pattern of the overall transducer 210 ensures that omnidirectional guided waves 216 (e.g., helical guided waves 206 in FIG. 19) are generated. In other embodiments, the MFC piezoelectric transducer 210 can have a patter that is a portion of a circle, such as a semi-circular design.

Figure 21:
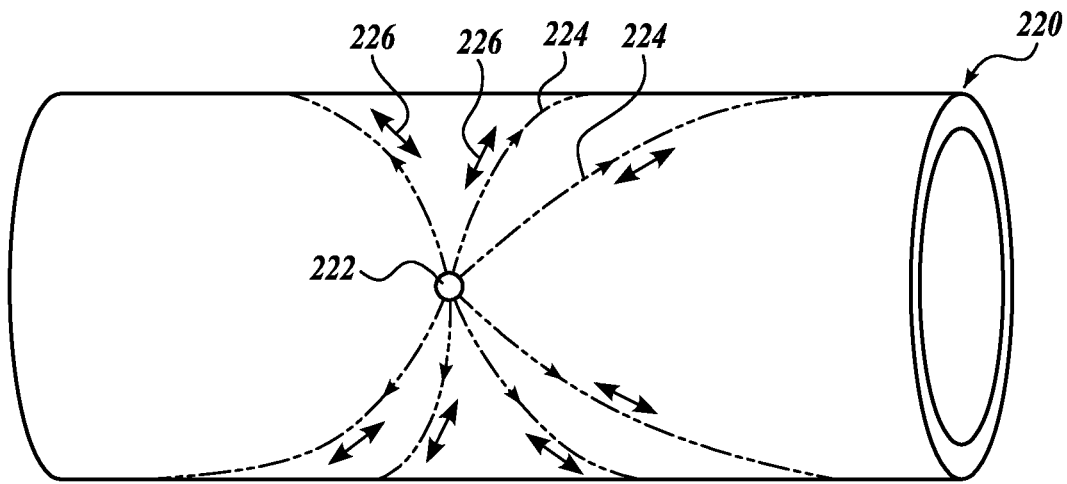
FIG. 21 depicts an embodiment of wave propagation where the particle oscillations are parallel to the direction of the helical guided waves.
Figure 22:
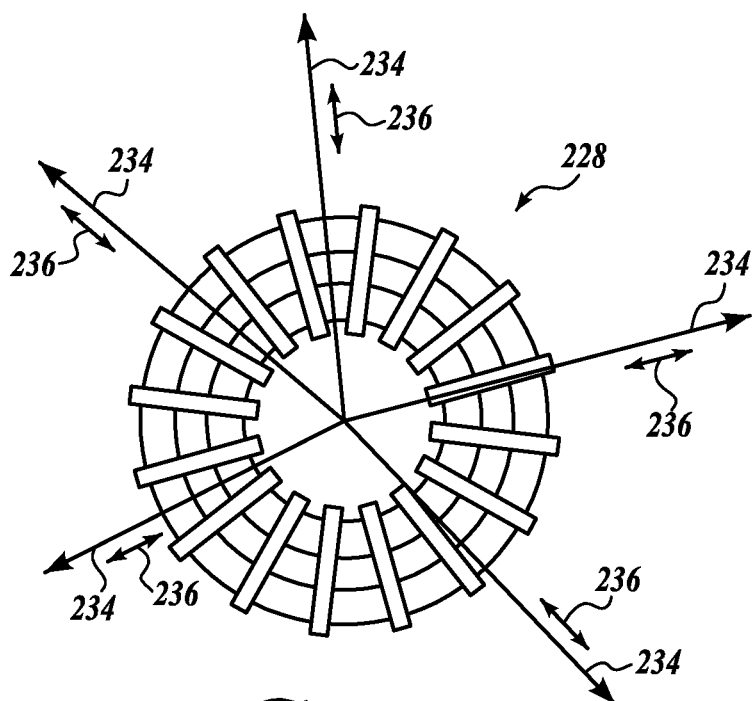
FIG. 22 depicts an embodiment of a macro fiber composite piezoelectric transducer design configured to achieve the guided waves depicted in FIG. 21.

FIG. 21 depicts an embodiment of wave propagation where the particle oscillations are parallel to the direction of the helical guided waves. As depicted, a pipe 220 has a transducer element 222 mounted thereon. The transducer element 222 is configured to emit helical guided waves 224. The helical guided waves 224 cause particle oscillation 226 tangential to the pipe 220 and parallel to the helical guided waves 224. In one embodiment, the particle oscillation 226 is achieved using a macro fiber composite (MFC) piezoelectric transducer 228 depicted in FIG. 21. As depicted, the MFC piezoelectric transducer 218 includes closely packed piezoelectric fibers 230 and electrical current carrying electrodes 232. The piezoelectric fibers 230 in an MFC elongate when electric current is passed through the electrodes 232. The particle displacement 236 (e.g., particle oscillation 226 in FIG. 21) of the resulting waves 234 (e.g., helical guided waves 224 in FIG. 21) continue to be along the direction that the piezoelectric fibers 186 elongate (i.e., normal to the resulting waves 216). The circular pattern of the overall transducer 228 ensures that omnidirectional guided waves 236 (e.g., helical guided waves 226 in FIG. 21) are generated. In other embodiments, the MFC piezoelectric transducer 228 can have a patter that is a portion of a circle, such as a semi-circular design.

Figure 23:
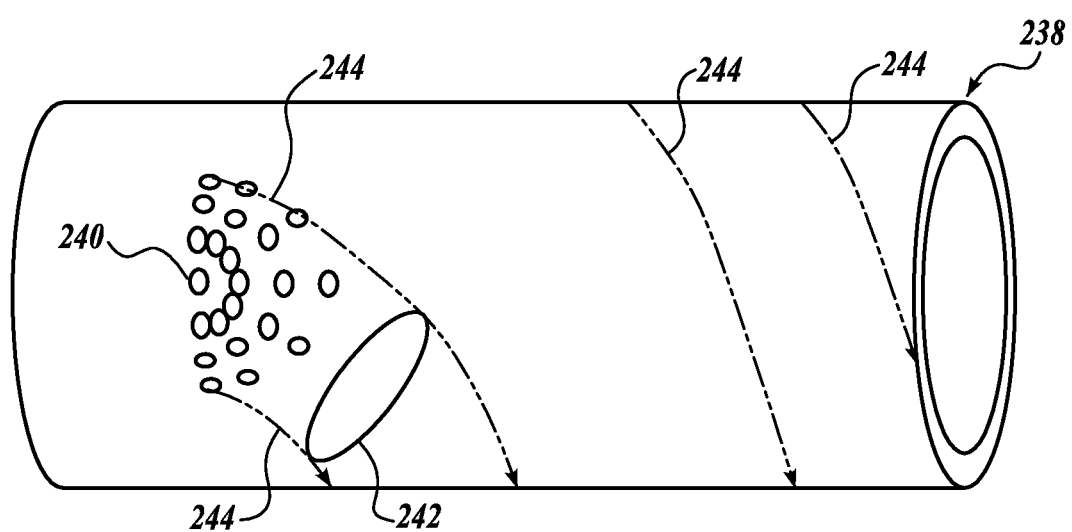
FIG. 23 depicts an embodiment of another transducer array configured to produce helical guided waves.

Transducer arrays do not need to be of the shape illustrated in FIG. 5 or 6. FIG. 23 depicts an embodiment of another transducer array configured to produce helical guided waves. As depicted, a pipe 238 includes a transducer array 240 configured to emit rays 244 aligned along a helix over the wall of the pipe 238. A beam 242 of guided waves is generated by controlling the actuation of the transducer array 240 on the pipe 238 such that the rays 244 are aligned along a helix over the wall of the pipe 238. Transducer arrays usable with the embodiments disclosed herein are not limited to the transducer arrays depicted in FIGS. 5, 6, and 23, but can take any number of other shapes.

Array Control Parameters

The first step of the algorithms illustrated in FIG. 7 and FIG. 8 includes loading a lookup table that may be generated by a modeling method (such as those detailed below), by a calibration method, or by a combination thereof. Both methods of generating the lookup tables have their advantages and disadvantages. Modeling methods have the advantage of giving an estimate of the how the particle oscillation of a wave might be. This enables modification of transducer design, as discussed below. However, the calculations involved in modeling methods are based on the assumptions of fixed material properties. It is well known that, irrespective of manufacturing process, structures have a statistical variation in properties. Calibration methods overcome this drawback. However, the data from calibration methods are specific to the particular hardware used. In in certain embodiments, the lookup table will be a combination of modeling methods and will be corrected with the help of calibration.

In FIG. 7 and FIG. 8, the term helicity stands for the angle formed by the helical path relative to the pipe axis when the pipe's cylindrical surface is unwrapped into a planar surface. Typically, the ray forms a straight line on this unwrapped surface in which case the helicity is constant. The term linear helicity may be used to describe this kind of helicity. However, it is possible that the waves may have a varying or nonlinear helicity. In other words, the ray may form a curve on the planar surface. Such waves can be used for augmenting the hidden flaw detection capability of this invention.

The term group velocity in FIG. 7 and FIG. 8 is the apparent velocity of a beam. The term group helicity in FIG. 7 and FIG. 8 can be explained as the manifestation tendency of a beam to change its direction towards one that nature mandates as the easiest path. This is possible in pipes made of any material. However, such a phenomenon will be observed more frequently in case of structures made from the so-called anisotropic materials, such as carbon fiber reinforced polymer composite. If the group helicity is different from the desired beam helicity, it can be both advantageous and disadvantageous from the point of view inspection. A different group helicity will add to the nonlinearity of the helical guided wave, helping detection and sizing of hidden flaws. On the flip side however, such beams tend to disperse away as they continue propagating, rendering it useless for long distance inspection.

As a departure from traditional methods, mixed time delay and amplitude control may be used to achieve high frequency guided wave propagation. Such a mixing of time delays and amplitude variation has been suggested in literature without taking into account the fact that the minimum time delay offered by hardware limits the frequency at which good quality beam forming is achieved. Time delays can be completely replaced by amplitude variation across the transducer elements. Further, amplitude control can be expressed in terms of time delay. Changing of time delays is much faster than amplitude change, particularly if the change in amplitude is large in value. In some of the embodiments disclosed herein, time delays may be used as much as possible. However, when the minimum time delay increment is not sufficiently small, amplitude control may be used to correct the deficiency. In such a scenario the amplitude change may be small and can be achieved at very high speeds. This will improve the resolution of the inspection system in proportion to the frequency that becomes possible.

Flaw Characterization

Flaw characterization involves the determination of one or more of the existence, location, size, shape and orientation of any flaw. Features that can be characterized as flaws include inclusions, cracks, corrosion, dents, attachments, welds, or any other type of non-uniform feature. The characteristics of the flaws will be extracted from the ultrasonic data received by the elements of transmitter array, a traveling or scanning receiver sensor, and/or a dedicated receiver array consisting of at least one sensor element that may be placed anywhere on the pipe. The receiver array, if any, may have its sensor elements distributed in any fashion, for example they may be distributed circumferentially or linearly. The signatures that help determine the existence of a flaw correspond to reflection of ultrasound from a flaw and/or an unexpected absence of ultrasonic signals. In one embodiment, the location is determined by taking into account the helical angle at which ultrasonic beam is launched at the transmitter and, in case of a signature caused due to reflection of ultrasound from a flaw, the properties of signature (e.g., its amplitude distribution in time or frequency domain), its arrival time relative to the time at which the beam was launched, or the helix angle of the reflected beam when it was received.

Figure 24:
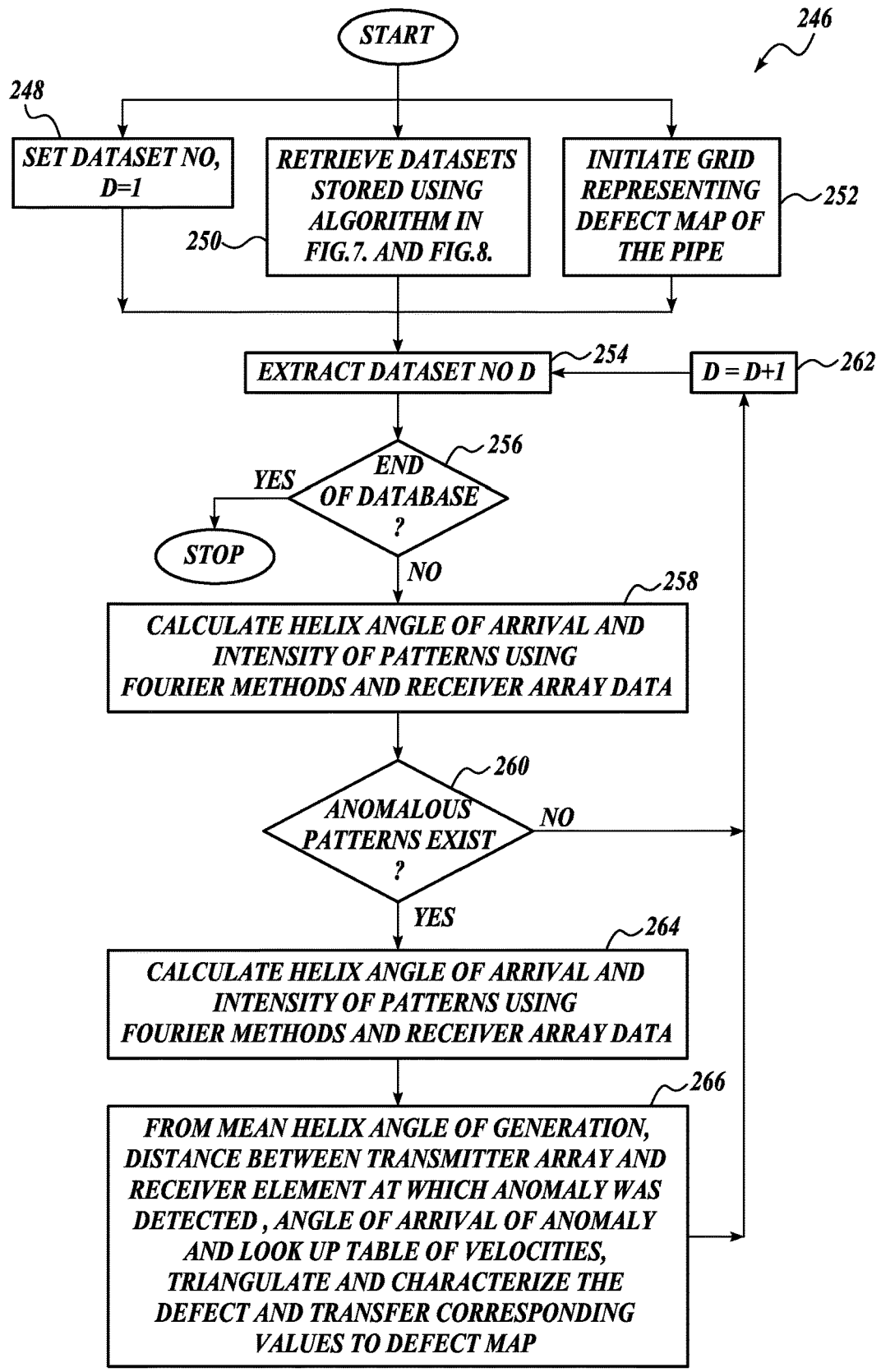
FIG. 24 depicts an embodiment of a method for mapping of flaw from inspection data.

The helix angle of the received reflection signal can be determined by several methods. In case of single receiver, the original transmit helix angle, the relative location of the receiver and arrival time of the received signal may be used to triangulate the location of the flaw. If a receiver is used, then, in addition signal processing methods (e.g., Fourier transforms) may be used to determine the angle of arrival. In all of the calculations, the lookup table is calculated using the theory discussed below. An example method 246 for mapping and/or obtaining a scanned image of pipe is illustrated in FIG. 24.

The method 246 beings with three steps that can be performed in series or in parallel. At block 248, a dataset variable is set to an initial value, such as D=1. At block 450, stored datasets are retrieved. In some embodiments, the stored datasets are retrieved using the methods depicted in FIGS. 7 and 8. At block 252, a grid representing a defect map of the pipe is initiated. At block 254, a dataset corresponding to the dataset variable is extracted. At block 256, a determination is made whether the dataset variable has been incremented to the end of the database. If the dataset variable has been incremented to the end of the database, then the method 246 ends. If the dataset variable has not been incremented to the end of the database, then the method 246 continues to block 258.

At block 258, a helix angle of arrival and intensity of patterns are calculated. In one embodiment, the helix angle of arrival and the intensity of patterns are calculated using Fourier transforms and/or receiver array data. At block 260, a determination is made whether an anomalous pattern exists. If no anomalous pattern exists, then the method 246 proceeds to block 262 where the dataset variable is incremented and then the method 246 returns to block 254. However, if an anomalous pattern exists, the method 246 proceeds to block 264. At block 264, a helix angle of arrival and an intensity of patterns are calculated. In one embodiment, the helix angle of arrival and the intensity of patterns are calculated using Fourier transforms and/or receiver array data. At block 266, the defect is triangulated and characterized and corresponding values are transferred to a defect map. In some embodiments, the defect is triangulated and characterized using a mean helix angle of generation, the distance between transmitter array and receiver element at which anomaly was detected, and/or the angle of arrival of anomaly and look up table of velocities. The method 246 then proceeds to block 262 where the dataset variable is incremented and then the method 246 returns to block 254.

Other Applications

The embodiments disclosed herein may be used for applications employing ultrasonic guided waves that achieve improved performance in the presence of high intensity ultrasound. Examples of such applications include nonlinear ultrasonic testing, ultrasonic deicing, ultrasonic cleaning, and processing involving sonochemistry.

As already mentioned, the subject matter disclosed herein includes methods for unfocussed and focused beam forming and steering of helical guided waves. The methods depicted in FIGS. 7 and 8 can be used for synthetic unfocused beam forming and synthetic focused beam forming, respectively; collectively called herein as synthetic beam forming. Synthetic beam forming includes application of methods similar to those depicted in FIGS. 7 and 8 to the set of signals (a) received individually by each receiver element of the receiver array, (b) received by a single receiver element but which originate from waves sequentially transmitted by each element of a transmitter array such that the corresponding waves do not interfere with one another for a desired or specified duration, or (c) a combination of both independent reception by the receiver elements and sequential generation (or transmission) by the transmitter array elements. In some embodiments, synthetic beam forming mimics the effects of real beam forming. If there are N receiver element and M transmitter elements, the total number of data sets for each type of synthetic beam forming approach will be N, M and N×M. This combined approach may be called a synthetic aperture imaging of the pipe using helical guided waves. In one embodiment, both of those methods depend on a lookup table of parameters such as frequency, velocity and helix angle combinations at which helical guided wave propagation is possible. In some embodiments, these parameters are evaluated using the theory discussed below. However, while the theory below is presented for isotropic media, the concepts can be extended to anisotropic materials such as crystals, rolled metals, and carbon fiber reinforced composites.

Bulk Wave Solutions

The governing equation for elastic wave propagation in an isotropic elastic medium is given by the balance of momentum and the Hooke's Law, which are respectively expressed as follows:

$$\nabla \cdot \sigma = \rho \frac{\partial^2 u}{\partial t^2} \qquad \text{1a}$$

$$\sigma = \lambda tr(\epsilon)I + \mu\epsilon \qquad \text{1b}$$

where, $\sigma$ is the stress tensor, u is the particle displacement vector and $\epsilon=(\nabla u+\nabla u^T)/2$ is the strain tensor and t is time. Combine Equations 1a and 1b the final equation of motion (or Navier's equation) is obtained as follows:

$$(\lambda + \mu)\nabla(\nabla \cdot u) + \mu\nabla \cdot \nabla u = \rho\frac{\partial^2 u}{\partial t^2} \qquad \text{2}$$

In order to solve Equation 2 the Helmholtz decomposition of u is employed that can be expressed as follows:

$$u=\nabla\Phi+\nabla\times\Psi \qquad \text{3a}$$

$$\nabla \cdot \Psi = f(r,t) \qquad \text{3b}$$

where, $\Phi$ and $\Psi$ are the Helmholtz scalar and vector potentials; f(r, t) is an arbitrary function and in terms of physical components with respect to the cylindrical coordinate system (r, θ, z), Equations 3a and 3b are $$u_r = \frac{\partial \Phi}{\partial r} + \frac{1}{r}\frac{\partial \Psi_z}{\partial \theta} - \frac{\partial \Psi_\theta}{\partial z} \quad \text{3c}$$

$$u_\theta = \frac{1}{r}\frac{\partial \Phi}{\partial \theta} + \frac{\partial \Psi_r}{\partial z} - \frac{\partial \Psi_z}{\partial r} \quad \text{3d}$$

$$u_z = \frac{\partial \Phi}{\partial z} + \frac{1}{r}\frac{\partial r\Psi_\theta}{\partial r} - \frac{1}{r}\frac{\partial \Psi_r}{\partial \theta} \quad \text{3e}$$

$$\frac{1}{r}\frac{\partial r\Psi_\theta}{\partial r} + \frac{1}{r}\frac{\partial \Psi_r}{\partial \theta} + \frac{\partial \Psi_z}{\partial z} = f(r,t) \quad \text{3f}$$

The Equation 3b is also called as Helmholtz' gauge invariance criterion. Substituting Equation 3a in Equation 2, the latter can be decomposed into a system of 4 partial differential equations, given by $$\nabla^2 \Phi - \frac{1}{c_1^2}\frac{\partial^2 \Phi}{\partial t^2} = 0 \quad \text{4a}$$

$$\nabla^2 \Psi_r - \frac{1}{r^2}\Psi_r - \frac{2}{r^2}\frac{\partial \Psi_\theta}{\partial \theta} - \frac{1}{c_2^2}\frac{\partial^2 \Psi_r}{\partial t^2} = 0 \quad \text{4b}$$

$$\nabla^2 \Psi_\theta - \frac{1}{r^2}\Psi_\theta - \frac{2}{r^2}\frac{\partial \Psi_r}{\partial \theta} - \frac{1}{c_2^2}\frac{\partial^2 \Psi_\theta}{\partial t^2} = 0 \quad \text{4c}$$

$$\nabla^2 \Psi_z - \frac{1}{c_2^2}\frac{\partial^2 \Psi_z}{\partial t^2} = 0 \quad \text{4d}$$

where, the scalar Laplacian operator $\nabla^2$ is given by $$\nabla^2 = \frac{\partial^2}{\partial r^2} + \frac{1}{r}\frac{\partial}{\partial r} + \frac{1}{r^2}\frac{\partial^2}{\partial \theta^2} + \frac{\partial^2}{\partial z^2} \quad 5$$

Assuming a trial solution, $\Phi = \phi e^{i(\alpha r \cos\theta + k_z z - \omega t)}$, where $\phi$ is an arbitrary constant and substituting in Equation 4a it can be shown $$\left(-\alpha^2 + k_z^2 - \frac{\omega^2}{c_1^2}\right)\phi = 0 \quad \text{6a}$$

For a non trivial $\phi$, $$\alpha^2 = k_z^2 - \frac{\omega^2}{c_1^2} \quad \text{6b}$$

Similarly, assuming the trial solution $\Psi_z = \psi_z e^{i(\beta r \cos\theta + k_z z - \omega t)}$, $\psi_z$ being an arbitrary constant, and substituting in Equation 4d the following can be demonstrated.

$$\left(-\beta^2 + k_z^2 - \frac{\omega^2}{c_2^2}\right)\psi_z = 0 \quad \text{6c}$$

$$\beta^2 = k_z^2 - \frac{\omega^2}{c_2^2} \quad \text{6d}$$

Let $\Xi_\beta$ be any function that also satisfies Equation 4d. Differentiating Equation 4d with respect to r and substituting $\Psi_z = \Xi_\beta$, the following equation is obtained:

$$\frac{\partial^3 \Xi_\beta}{\partial r^3} - \frac{1}{r^2}\frac{\partial \Xi_\beta}{\partial r} + \frac{1}{r}\frac{\partial^2 \Xi_\beta}{\partial r^2} - \frac{2}{r^3}\frac{\partial^2 \Xi_\beta}{\partial \theta^2} + \frac{1}{r^2}\frac{\partial^3 \Xi_\beta}{\partial r \partial \theta^2} + \frac{1}{r^2}\frac{\partial^3 \Xi_\beta}{\partial r \partial z^2} - \frac{1}{c_2^2}\frac{\partial^3 \Xi_\beta}{\partial r \partial t^2} = 0 \quad 7$$

Using Equation 7, it can be shown that Equations 4b and 4c are simultaneously satisfied if the $\Psi_r$ and $\Psi_\theta$ have the following form:

$$\begin{bmatrix} \Psi_r \\ \Psi_\theta \end{bmatrix} = \begin{bmatrix} \psi_{T1} & \psi_{T2} \\ -\psi_{T2} & \psi_{T1} \end{bmatrix} \begin{bmatrix} \frac{\partial \Xi_\beta}{\partial r} \\ \frac{1}{r}\frac{\partial \Xi_\beta}{\partial \theta} \end{bmatrix} \quad 8$$

where, as before $\psi_{Tj}$; j=1, 2 are arbitrary constants and the subscript T stands for the term transverse. It may be noted that the expressions $e^{i(\alpha r \cos\theta + k_z z - \omega t)}$ and $e^{i(\beta r \cos\theta + k_z z - \omega t)}$ represent plane waves propagating in the x–z plane. The solutions presented thus far can be modified to the more general case of a plane wave propagating at any orientation in the r–θ plane. Before proceeding in this direction, new notations need to be introduced, viz. $\Xi_\eta = e^{i(\eta r \cos(\theta - \bar\theta_\eta) + k_z z - \omega t)}$, where $\eta = \alpha, \beta_Z, \beta_T$. Using this new scheme of notation, the solutions are recapitulated as follows:

$$\Phi = \phi \Xi_\alpha \quad \text{9a}$$

$$\begin{bmatrix} \Psi_r \\ \Psi_\theta \\ \Psi_z \end{bmatrix} = \begin{bmatrix} \psi_{T1} & \psi_{T2} & 0 \\ -\psi_{T2} & \psi_{T1} & 0 \\ 0 & 0 & \psi_z \end{bmatrix} \begin{bmatrix} \partial \Xi_{\beta_T}/\partial r \\ \frac{1}{r}\frac{\partial \Xi_{\beta_T}}{\partial \theta} \\ \Xi_{\beta_z} \end{bmatrix} \quad \text{9b}$$

where, although $\beta_Z = \beta_T = \beta$ that $\bar\theta_{\beta_z} \neq \bar\theta_{\beta_T}$ which further generalizes the solutions. It may be verified that this does not affect the consistency of equations thus far.

The final step before writing down the most general solution for $\Phi$ and $\Psi$, it is necessary to consider the Helmholtz gauge invariance criterion (Equation 3b). The choice of f (r, t) on the right hand side of Equation 3b is arbitrary. It can be shown that f (r, t) vanishes whenever $\bar\theta_{\beta_Z} = \bar\theta_{\beta_T}$, in which case Equation 3b reduces to:

$$(-\beta^2 \psi_{T1} + ik_z \psi_z)\Xi_\beta = 0 \quad 10$$

From here on the convention $\Xi_{\beta_T} = \Xi_{\beta_T} = \Xi_\beta$ will be employed. The general solution for $\Phi$ and $\Psi$ can be written as:

$$\Phi = [\phi^+ \Xi_{+\alpha} + \phi^- \Xi_{-\alpha}]e^{i(k_z z - \omega t)} \quad \text{11a}$$

-continued $$\begin{bmatrix} \Psi_r \\ \Psi_\theta \\ \Psi_z \end{bmatrix} = \begin{bmatrix} \frac{ik_z}{\beta^2}\psi_z^+ & \psi_{T2}^+ & 0 \\ -\psi_{T2}^+ & \frac{ik_z}{\beta^2}\psi_z^+ & 0 \\ 0 & 0 & \psi_z^+ \end{bmatrix} \begin{bmatrix} \frac{\partial \Xi_{+\beta}}{\partial r} \\ \frac{1}{r}\frac{\partial \Xi_{+\beta}}{\partial \theta} \\ \Xi_{+\beta} \end{bmatrix} + \quad \text{11b}$$

$$\begin{bmatrix} \frac{ik_z}{\beta^2}\psi_z^- & \psi_{T2}^- & 0 \\ -\psi_{T2}^- & \frac{ik_z}{\beta^2}\psi_z^- & 0 \\ 0 & 0 & \psi_z^- \end{bmatrix} \begin{bmatrix} \frac{\partial \Xi_{-\beta}}{\partial r} \\ \frac{1}{r}\frac{\partial \Xi_{-\beta}}{\partial \theta} \\ \Xi_{-\beta} \end{bmatrix}$$

where, $\Xi_\eta = e^{i\eta r \cos(\theta)}$, $\eta = \pm\alpha, \pm\beta$; $\phi^\pm$ and $\psi_m^\pm$, m=T2, z are arbitrary coefficients corresponding to $\pm\alpha$ and $\pm\beta$, respectively. For convenience the number "2" in the subscript T2 will be dropped from the equations henceforth. Substituting Equations 12a and 12b in Equations 3a-3c, the expressions for the particle displacement vectors can be obtained as follows:

$$\begin{bmatrix} u_r \\ u_\theta \\ u_z \end{bmatrix} = U^+ X^+ + U^- X^- \begin{bmatrix} \phi^+ \Xi_{+\alpha} \\ \psi_T^+ \Xi_{+\beta} \\ \psi_z^+ \Xi_{+\beta} \end{bmatrix} \text{where,} \quad \text{12a}$$

$$U^\pm = \begin{bmatrix} \pm i\alpha C_\alpha & \mp k_z \beta C_\beta & \mp i\left(1+\frac{k^2}{\beta^2}\right)\beta S_\beta \\ \mp i\alpha S_\alpha & \pm k_z \beta S_\beta & \mp i\left(1+\frac{k^2}{\beta^2}\right)\beta C_\beta \\ ik_z & \beta^2 & 0 \end{bmatrix} \quad \text{12b}$$

$$X^\pm = \begin{bmatrix} \phi^\pm \Xi_{\pm\alpha} \\ \psi_T^\pm \Xi_{\pm\beta} \\ \psi_z^\pm \Xi_{\pm\beta} \end{bmatrix} \text{where,} \quad \text{12c}$$

$C_\eta = \cos(\theta - \theta_\eta)$ and $S_\eta = \sin(\theta - \theta_\eta) = \eta = \alpha, \beta$.

Formulation for Guided Waves

The field of guided wave propagation in isotropic pipes includes as study of several fundamental problems including propagation in rods, submerged pipes, fluid carrying pipes and multilayered pipes. For the sake of simplicity, only the formulation and analysis of guided waves in a single layered pipe is presented.

For modeling guided waves the traction vector components on the pipe surface are required and are given by:

$$\begin{bmatrix} \sigma_{rr} \\ \sigma_{r\theta} \\ \sigma_{rz} \end{bmatrix} = D^+ X^+ + D^- X^- \text{ where,} \quad \text{13a}$$

$$D^\pm = \begin{bmatrix} -(\lambda\omega^2/c_1^2 + 2\mu\alpha^2 C_\alpha^2) & -2i\mu k_z \beta^2 C_\beta^2 & 2\mu\left(1+\frac{k_z^2}{\beta^2}\right)\beta^2 S_\beta C_\beta \\ 2\mu\alpha^2 S_\alpha C_\alpha & 2i\mu\beta^2 S_\beta C_\beta & \mu\left(1+\frac{k_z^2}{\beta^2}\right)\beta^2(C_\beta^2 - S_\beta^2) \\ \mp 2\mu k_z \alpha C_\alpha & \pm i\mu(\beta^2 - k_z^2)\beta C_\beta & \pm\mu\left(1+\frac{k_z^2}{\beta^2}\right)k_z \beta S_\beta \end{bmatrix} \quad \text{13b}$$

General Solution: Nonlinear Helicity

For a single-layered pipe the formulation is achieved by traction free boundary conditions at both the surfaces of the pipe. Let the pipe wall thickness be $2\Delta R$ and the mean radius of the pipe wall be given by R. Substitution of vanishing traction vectors in Equation 13, evaluated at $R+\Delta R$ and $R-\Delta R$, the following expression is obtained $$GX = \begin{bmatrix} D^{(+)}E^{(+)} & D^{(-)}E^{(-)} \\ D^{(+)}E^{(-)} & D^{(-)}E^{(+)} \end{bmatrix} \begin{bmatrix} X^+(R) \\ X^-(R) \end{bmatrix} = \begin{bmatrix} 0 \\ 0 \end{bmatrix} \quad 14$$

where $E^\pm$ stands for the diagonal matrix whose entries are given by $e^{\pm i\alpha\Delta R \cos\theta}$, $e^{\pm i\beta\Delta R \cos\theta}$ and $e^{\pm i\beta\Delta R \cos\theta}$, respectively. For non-trivial X, the following condition must be satisfied:

$$\Gamma := \det[G] = 0 \quad 15$$

where det[G] stands for the determinant of the matrix G.

Equation 15 is termed as the dispersion relation that may be solved for different combinations of $\theta$, $\theta_\alpha$, $\theta_\beta$. For each such combination dispersion curves that are a function of $\omega$, k are obtained. For each point on the dispersion curve, Equation 15 may be numerically solved for $X^{(\pm)}(R)$, from which the arbitrary coefficients $\phi^\pm$, $\psi_T^\pm$, $\psi_z^\pm$ and subsequently, the displacement and traction components may be evaluated. It will be shown later that for some special cases analytical expressions for the dispersion curves are possible. For further discussion the following new notation is introduced:

$$g_z = g_z(\theta,\omega) := \{k_z: \Gamma(k_z,\theta,\omega) = 0\} \quad 16$$

where, $g_z$ is the wavenumber of guided wave (which is denoted by the superscript). Equation 17 makes explicit an otherwise implicit assumption in guided wave modeling that in general the axial wavenumber, $k_z$ is an independent quantity while $g_z$, the wavenumber of the guided waves are given by a subset of values of $k_z$ that satisfy Equation 15 and that therefore, $g_z$ does not remain an independent quantity. This notion or notation is used in subsequent derivations to avoid confusion, particularly when differentiation with respect to wavenumbers is involved.

The phase of the guided wave may therefore be expressed as $P = g_z z - \omega t$. The phase, P represents the guided wave front whenever it is constant. Thus its derivative relative to time results the following expression:

$$\frac{dP}{dt} = \frac{\partial P}{\partial z}\frac{dz}{dt} + \frac{1}{r}\frac{\partial P}{\partial \theta}\frac{rd\theta}{dt} - \omega = 0 \quad \text{17a}$$

The coefficients of the time derivatives in Equation 17 give the wave-vector components, one of which is $$g_z = \frac{\partial P}{\partial z}$$

that can be evaluated by solving Equation 16. The other coefficient gives the wave-vector along the circumferential direction and may be expanded as follows:

$$g_\theta = \frac{1}{r}\frac{\partial P}{\partial \theta} = \frac{z}{r}\frac{\partial g_z}{\partial \theta} \qquad 17b$$

where $g_\theta$ is the angular wavenumber. The phase helical angle, $\bar{\theta}_p$ that is defined here as the angle—measured relative to z-axis on circular sheet or radius r on a pipe—along which a wave of monochromatic frequency is travelling is given by the relation $$\tan\bar{\theta}_p = \frac{g_\theta}{g_z} \qquad 17c$$

Equations 18b and 18c show that the angular wavenumber of the guided wave is dependent on the axial distance as well. Since $g_z$ is independent of z, it follows that the helical guided waves may tend to become circumferential guided waves. Thus the solutions in this section indicate the possibility of guided waves with non-linear helicity. It will be numerically shown later that most guided waves of nonlinear helicity are lossy and will therefore propagate only over short axial distances.

Although the components of phase velocity may be expressed as $$c_z = \frac{\omega}{g_z}, c_\theta = g_\theta,$$

phase velocity is a term that is frequently used in guided wave literature, in most practical scenarios, the group velocity is the more important and directly measurable quantity. The corresponding components of group velocity $v_z$, $v_\theta$ are given by:

$$v_z = \frac{\partial \omega}{\partial g_z} \qquad 18a$$

$$v_\theta = \frac{\partial \omega}{\partial g_\theta} \qquad 18b$$

Consequently, we may define a group helical angle, $\bar{\theta}_v$ as follows:

$$\tan\bar{\theta}_v := \frac{v_\theta}{v_z} \qquad 19$$

The group helical angle has thus far not been reported in literature. The concept is analogous to skewing of guided waves propagating in an anisotropic plate.

With these general derivations, it may be inferred that wave propagation in pipes may be more complex than it is otherwise thought to be. The formulation presented till now allows several inferences that are not as straightforward when using Bessel's function based solutions to be made. The first non-trivial inference that can be drawn from Equations 14 and 15 is that the dispersion relation propagation in a pipe does not depend upon the mean radius of the pipe. The effect of curvature is however, manifested through the dependence of G on θ. The dispersion curves will scale relative to the wall thickness, a feature that is also observed in case of plates. In the subsequent section formulation restricted to guided waves of linear helicity will be presented.

Guided Waves of Linear Helicity

For the analysis of guided waves of linear helicity, consider the terms representing the phases of $\Xi_\alpha$ and $\Xi_\beta$:

$$P_\alpha = \alpha r \cos(\theta - \bar{\theta}_\alpha) + k_z - \omega t \qquad 20a$$

$$P_\beta = \beta r \cos(\theta - \bar{\theta}_\beta) + k_z - \omega t \qquad 20b$$

The corresponding wave-vectors are obtained by taking the vector gradient of the Equations 20a and 20b which in component form are:

$$k_\alpha = [\alpha \cos(\theta - \bar{\theta}_\alpha), -\alpha \sin \theta - \bar{\theta}_\alpha, k_z]^T \qquad 21a$$

$$k_\beta = [\beta \cos \theta - \bar{\theta}_\beta, -\beta \sin \theta - \bar{\theta}_\beta, k_z]^T \qquad 21b$$

The quantities enumerated in the vectors in Equations 21a and 21b are the radial, circumferential and axial wavenumbers, respectively. To provide a relationship between $\bar{\theta}_\alpha$ and $\bar{\theta}_\beta$ the following relationship is enforced:

$$\alpha \sin \theta - \bar{\theta}_\alpha = \beta \sin \theta - \bar{\theta}_\beta = -k_\theta \qquad 23$$

That is the tangential components of the wave-vector are unique, which is an extension of the concept from two and three dimensional plate guided wave theory. If this rule is violated then as also observed in the previous section, the wave propagation will be attenuated because of destructive interference of the waves.

Using Equation 19, introducing the notations, $\bar{\alpha} := \alpha \cos(\theta - \bar{\theta}_\alpha) = \sqrt{\alpha^2 - k_\theta^2}$ and $\bar{\beta} := \beta \cos \theta - \bar{\theta}_\beta = \sqrt{\beta^2 - k_\theta^2}$; the formulation for guided waves will remain similar except for the following:

$$U^\pm = \begin{bmatrix} \pm i\bar{\alpha} & \mp k_z\bar{\beta} & \pm i\left(1+\frac{k_z^2}{\beta^2}\right)k_\theta \\ \pm ik_\theta & \mp k_zk_\theta & \mp i\left(1+\frac{k_z^2}{\beta^2}\right)\bar{\beta} \\ ik_z & \beta^2 & 0 \end{bmatrix} \qquad 24a$$

$$D^\pm = \begin{bmatrix} -(\lambda\omega^2/c_1^2 + 2\mu\bar{\alpha}^2) & -2i\mu k_z\bar{\beta}^2 & -2\mu\left(1+\frac{k_z^2}{\beta^2}\right)k_\theta\bar{\beta} \\ -2\mu k_\theta\bar{\alpha} & -2i\mu k_\theta\bar{\beta} & \mu\left(1+\frac{k_z^2}{\beta^2}\right)(\beta^2-k_\theta^2) \\ \mp 2\mu k_z\bar{\alpha} & \pm i\mu(\beta^2-k_z^2)\bar{\beta} & \mp\mu\left(1+\frac{k_z^2}{\beta^2}\right)k_zk_\theta \end{bmatrix} \qquad 24b$$

$$\Xi_{\pm\eta} = e^{i\bar{\eta}r}, \eta = \alpha, \beta \qquad 24c$$

Note that for numerical stability, it is advisable to replace $D^\pm$ with $\bar{D}^\pm = \beta^2 D^\pm$ in order to remove the $\beta^2$ term from the denominator. For the sake of brevity, however, this will not be explicitly done here. Analogous to Equation 17 the wave vector of the guided wave is given by:

$$g_\theta = k_\theta \qquad 25a$$

$$g_z = g_z(g_\theta, \omega) := \{k_z : \Gamma(k_z, g_\theta, \omega) = 0\} \qquad 25b$$

Alternately, $$g_z = k_z \qquad 25c$$

$$g_\theta = g_\theta(g_z, \omega) := \{k_z : \Gamma(g_z, k_\theta, \omega) = 0\} \qquad 25d$$

Thus linear helical guided waves are independent of the physical angle θ. This suggests that the dispersion relations for guided wave in pipe may be equivalent to those in plates. The formulation in this section may also be interpreted to mean that due to the phenomenon of interference the orientations, $\bar{\theta}_\alpha$, and $\bar{\theta}_\beta$ of the partial waves change as the guided wave of linear helicity propagates along the corresponding helical path.

For the purpose of generating the lookup table as illustrated in the flowcharts (e.g., in FIGS. 7 and 8), it is desirable to evaluate the wave number $g_p$ along and helix angle $\bar{\theta}_p$. This may be achieved by setting $k_\theta = k \sin(\bar{\theta}_p)$ and $k_z = k \cos(\bar{\theta}_p)$ and then solving equation 16 for k. This may be mathematically stated as:

$$g_p = g_p(\bar{\theta}_p, \omega) := \{k : \Gamma(k, \bar{\theta}_p, \omega) = 0\} \qquad 26$$

Subsequently, the group velocity components $v_v$ and $v_t$ along the helix angle $\bar{\theta}_p$ and the transverse direction $\pi/2 - \bar{\theta}_p$, may be evaluated in a manner that is analogous to Equations 19a and 19b and are given by $$v_p = \frac{\partial \omega}{\partial g_p} \qquad 27a$$

$$v_t = \frac{1}{g} \frac{\partial \omega}{\partial \bar{\theta}_p} \qquad 27b$$

Consequently, we may define a group helical skew angle, $\bar{\theta}_s$ as follows $$\tan \bar{\theta}_s := \frac{v_t}{v_p} \qquad 28$$

The skew angle, $\bar{\theta}_s$ is a direct measure of the angle by which a helical guided wave beam will deviate from the helix angle, $\bar{\theta}_p$ when generated using a pulsed excitation.

A particular case of helical guided wave propagation is the circumferential guided wave for which $\bar{\theta}_p = \pi/2$ or in other words, $k_z = 0$. Results from traditional approaches suggest that the circumferential wavenumber is proportional to the radius of the pipe—an aspect that is not observed in the current formulation.

Numerical Results

In this section, numerically calculated dispersion properties corresponding to some helical angles including axial guided waves and circumferential guided waves will be explored. The example case of a steel pipe of 8.4 mm wall thickness is considered. The bulk longitudinal velocity, $c_1$ and the bulk shear velocity, $c_2$ and the density, $\rho$ are assumed to be 5.94 mm/μs, 3.25 mm/μs and 7.8 g/cc; respectively. The dispersion curves were traced using Muller's method.

Figure 25:
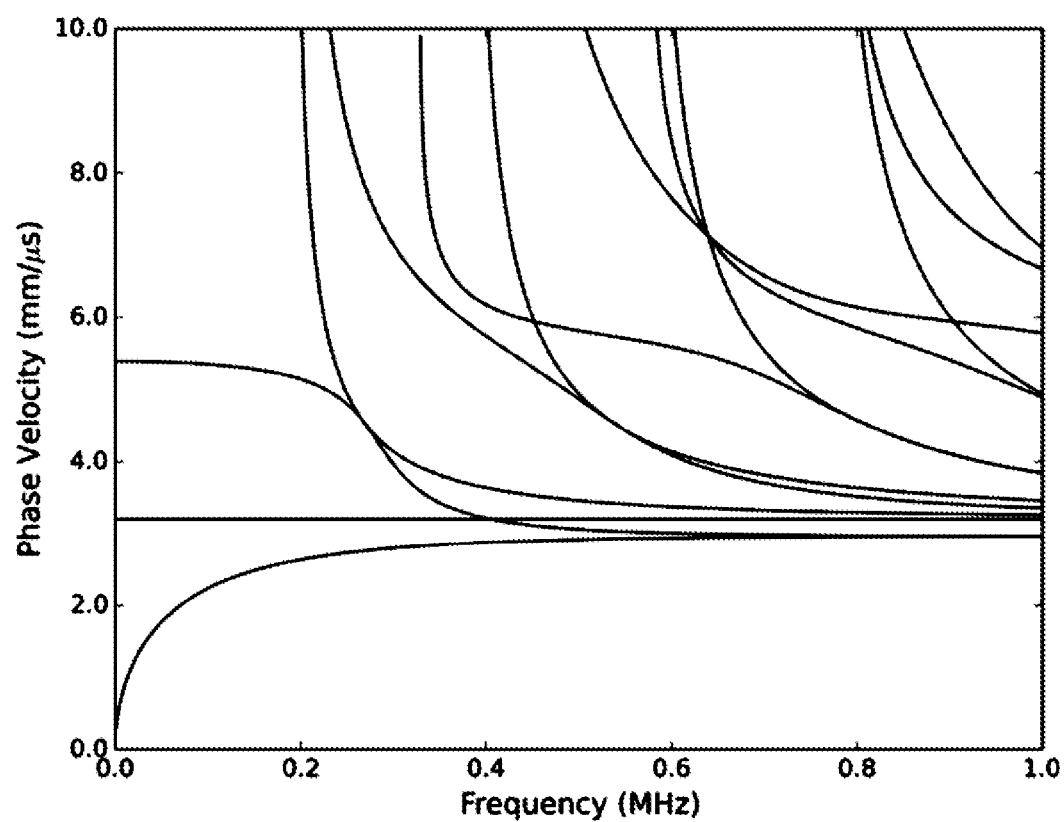
FIG. 25 depicts an example chart with dispersion curves for $\gamma=0\bar{\theta}_p=0$ which are similar to dispersion curves guided waves in a flat plate.
Figure 26A:
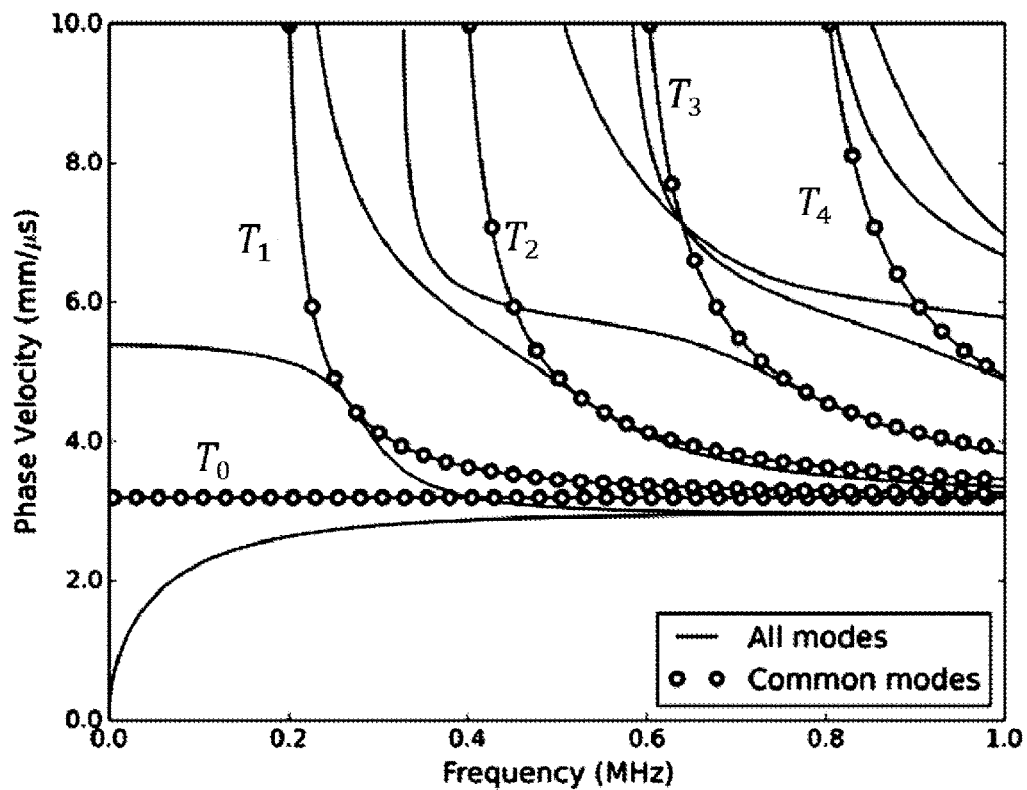
FIGS. 26A to 26D depict dispersion curves for guided waves along helical angles corresponding to, respectively, 0°, 30°, 60°, and 90°, with modes common to all helical angles marked using circular markers.
Figure 26B:
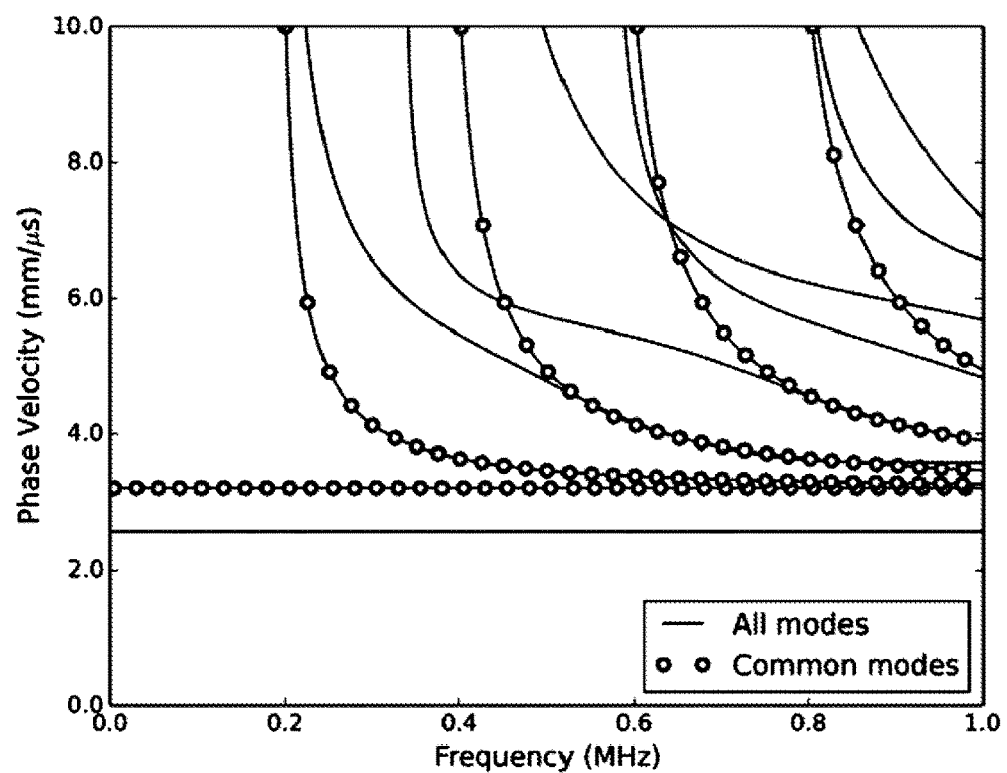
Figure 26C:
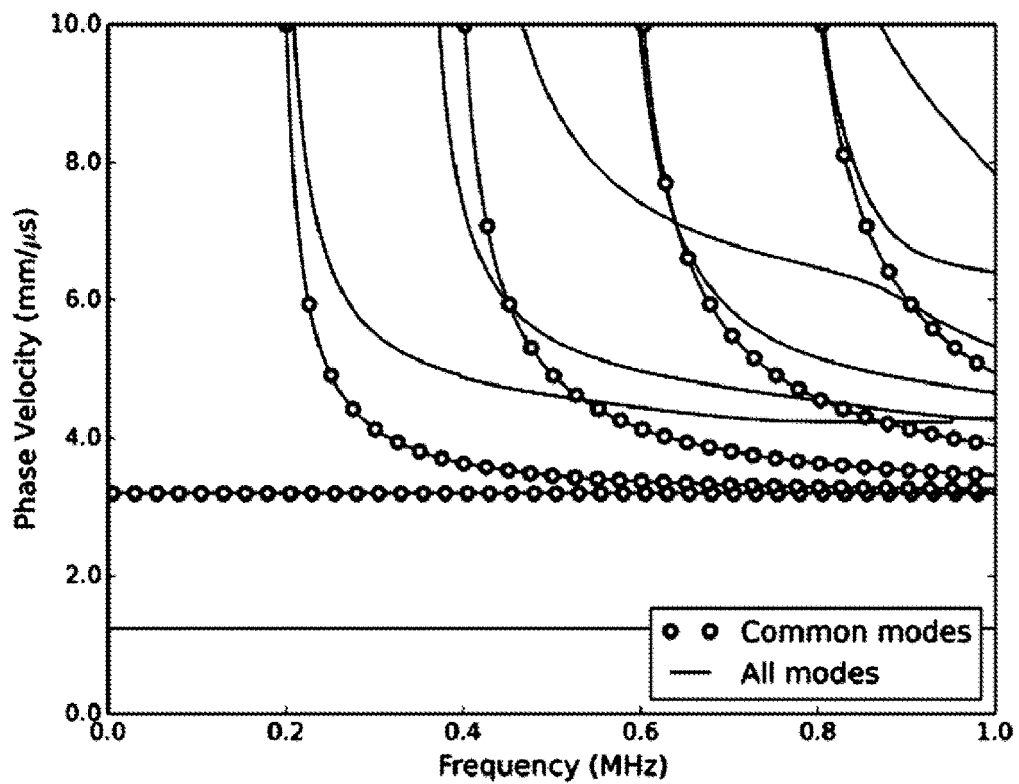
Figure 26D:
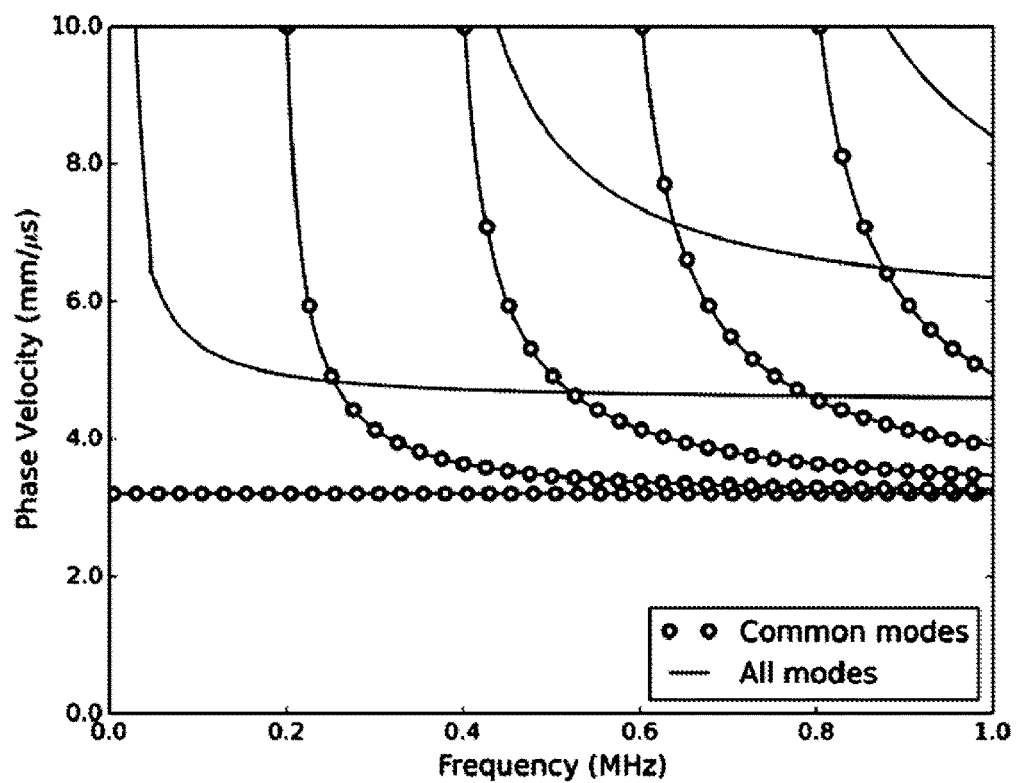

First, consider the phase velocity dispersion curves corresponding to axially propagating modes ($\bar{\theta}_p = 0$), shown in FIG. 25, which includes all the different types of modes that are traditionally classified as longitudinal, flexural and torsional modes. As already mentioned, the dispersion curves for pipes are identical to the dispersion curves in a flat plate that are analogously classified as symmetric, anti-symmetric and shear horizontal modes. This equivalence of axially-propagating pipe guided waves and plate guided waves is in conformity with the traditional knowledge.

The variation of the dispersion curves for guided waves along 0°, 30°, 60° and 90° helical angles are illustrated in FIGS. 26A to 26D. As highlighted in FIGS. 26A to 26D, the modes that resemble torsional modes (e.g., in the case of axial guided waves) are common to all helical angles of propagation. These common modes are also labeled as $T_0$, $T_1$, $T_2$ and $T_3$ in FIG. 26A. In the case of 30° and 60° helical angles, the modes that are not common to all helical angles correspond to complex valued roots of the dispersion relation. It can be therefore inferred that these modes will propagate over limited distances depending on the value of the imaginary part (i.e., they will propagate but will eventually attenuate). This inference is non-intuitive because a loss-less system (Equations 1a and 1b) is assumed herein and one may expect either real or imaginary (non-propagating) modes as is typical in the case of Bessel function based approach for pipe guided waves as well as in the case of plate guided wave theory. This prediction of attenuative but propagating modes can be explained by comparing the current formulation with the traditional Bessel function based formulation. Traditional Bessel-function-based solutions inherently predict helical guided wave modes that propagate with radially varying helical angles. In other words, the characteristic of these modes is to diverge as they propagate along a mean helical angle. This divergence will cause the modes to eventually dissipate with a severity that is directly and inversely proportional to the pipe's wall thickness and its mid-radius, respectively. The current formalism that is based on constant helical angle distribution therefore appears to account for this divergence (and hence dissipation) of such modes by predicting them to be in effect attenuative. It may be noted that this is merely a conjecture and further analysis is necessary to relate the respective modal characteristics of the current and traditional formulations.

Figure 27A:
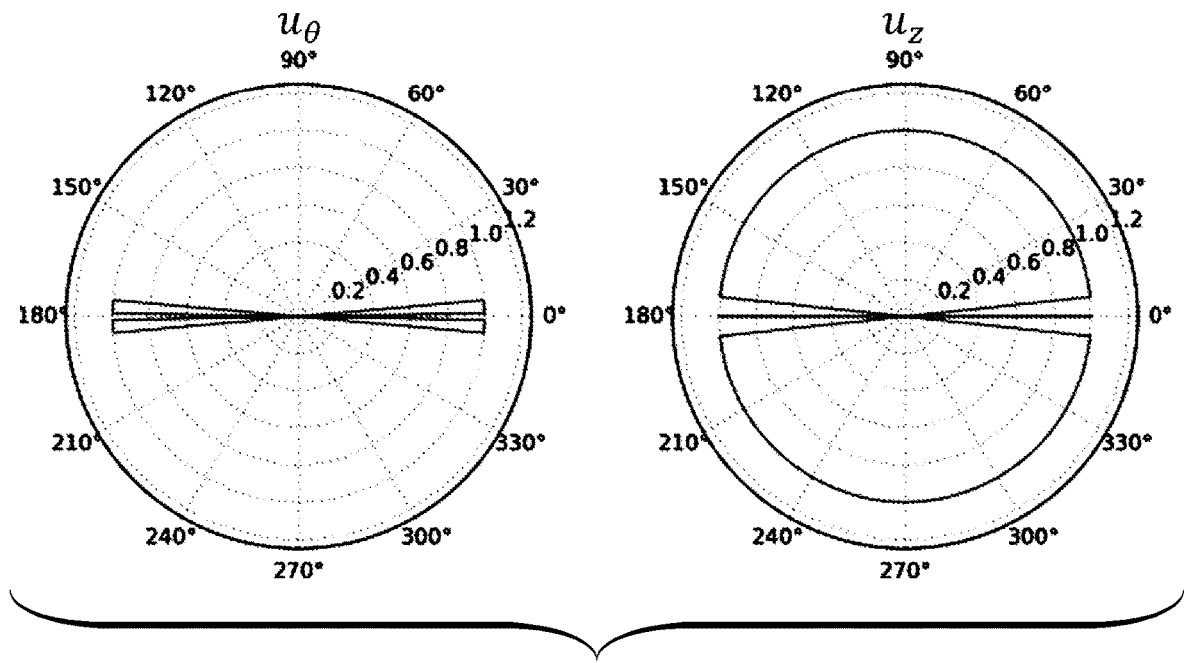
FIGS. 27A to 27D depict wave structure patterns relative to helical angle at the outer surface of the pipe for the common modes T0, T1, T2, and T3 $T_0$, $T_1$, $T_2$ (as labeled in FIG. 26A) corresponding to frequencies of, respectively, 0.3 MHz, 0.36 MHz, 0.48 MHz, and 0.67 MHz.
Figure 27B:
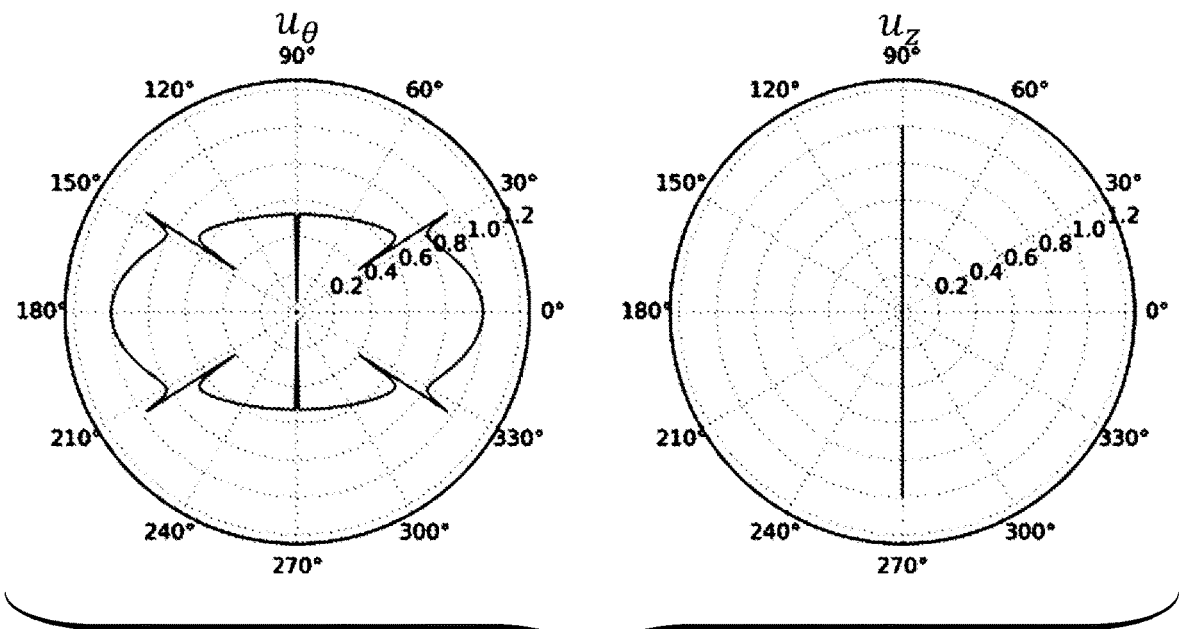
Figure 27C:
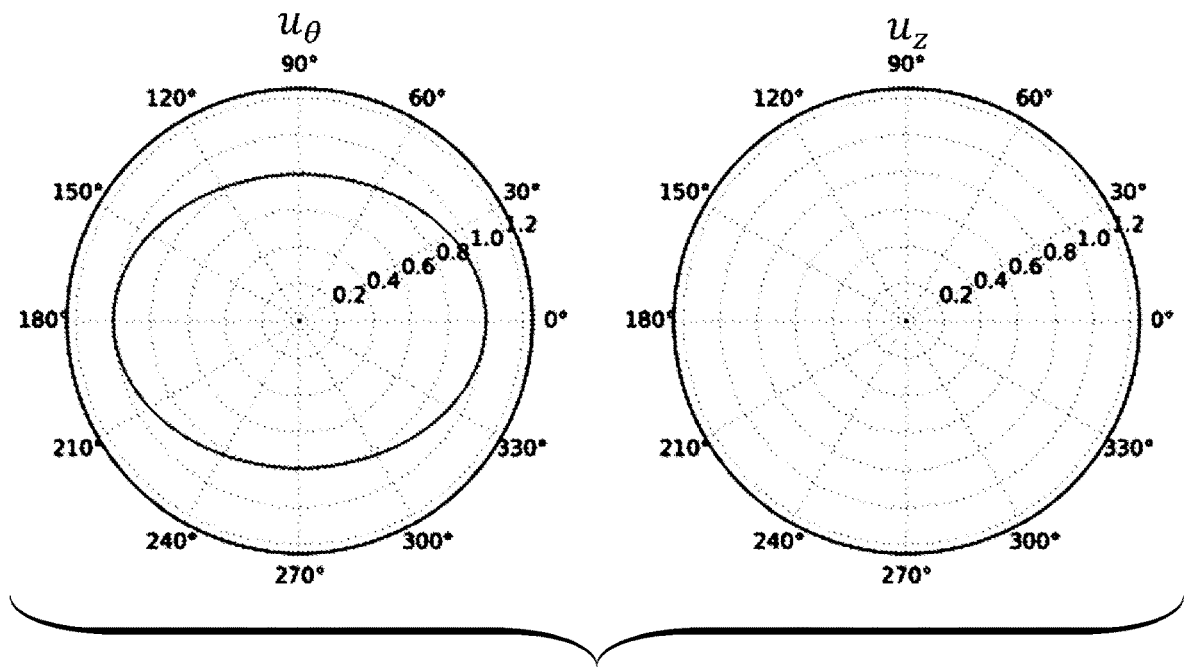
Figure 27D:
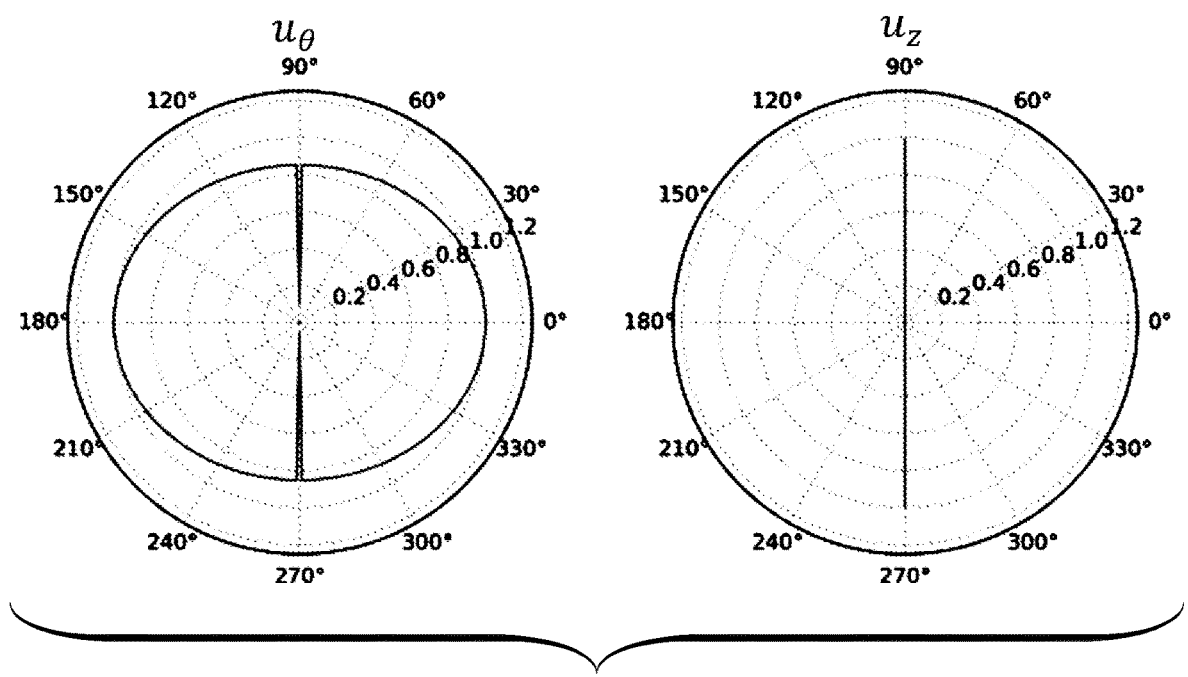

For designing transducers for generation and reception of helical guided waves, it is important to investigate the respective distribution of particle displacement vector components (or "wavestructure") of the guided wave modes with the variation in helical angle. The comparison is restricted to only the modes that are common to all the helical angles. For the sake of brevity, the displacement patterns are further restricted to the outer radius of the pipe and to only the axial and torsional components of the normalized displacement vector. FIGS. 27A to 27D illustrate the displacement patterns for the common modes $T_0$, $T_1$, $T_2$ and $T_3$ (as labeled in FIG. 26A) at frequencies of 0.3 MHz, 0.36 MHz, 0.48 MHz, and 0.67 MHz, respectively. As stated in the previous section, both lamb-type and shear horizontal circumferential guided waves (90° helical angle) have common dispersion curves, which also happen to be the modes that are highlighted in FIG. 26D. Therefore, in FIGS. 27A to 27D, the displacement values for the 90° helical angle are numerical aberrations as the results were calculated using a three-dimensional model (i.e., decoupled two-dimensional analysis predicts that both axial (shear horizontal) and torsional (lamb-type) displacements are independently possible). In FIG. 27A, the axial displacement seems to be predominant for the axially propagating (0° helical angle) torsional wave mode ($T_0$). This is also an artifact of using a three-dimensional model for numerical analysis as the decoupled analytical result predicts that the torsional displacement should be the predominant displacement component. FIGS. 27A to 27D, however demonstrate that the common helical guided wave modes have predominantly torsional displacement components in general, except for the model labeled as $T_0$ that has predominantly an axial displacement component.

Finite Element Simulation

Figure 28A:
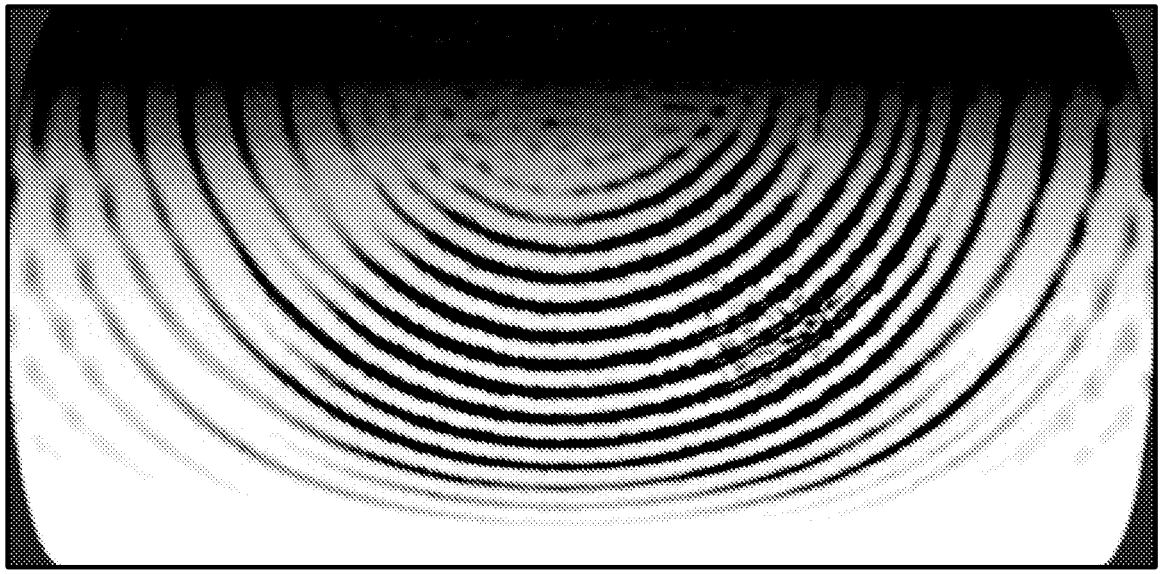
FIGS. 28A and 28B depicts a finite element simulation snapshot of beam propagating at, respectively, 45° helical angle to the pipe axis and 60° helical angle to the pipe axis.
Figure 28B:
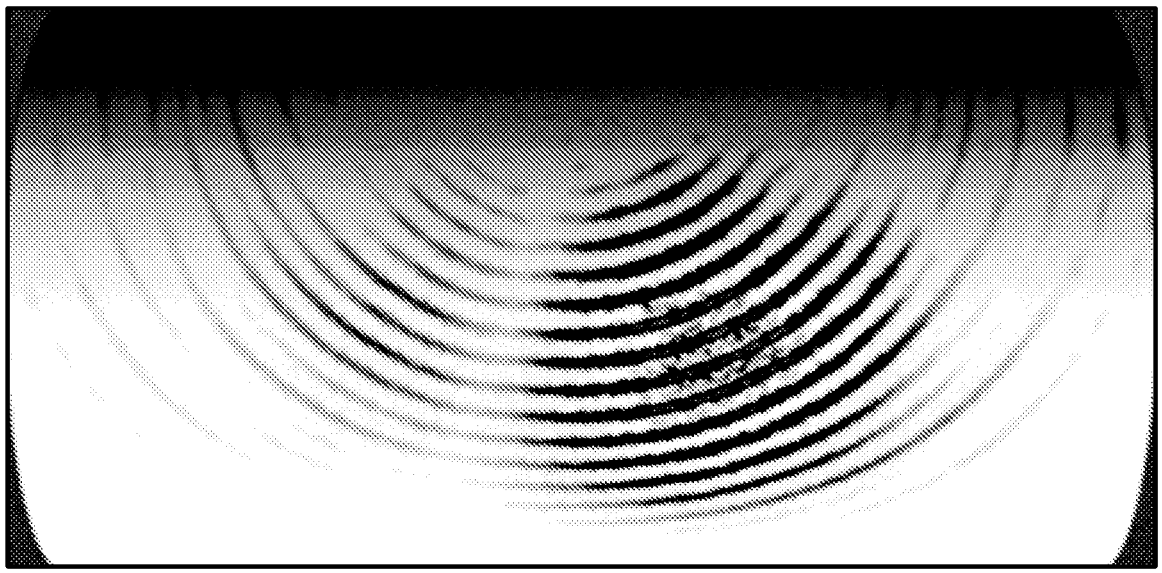

Finite element simulations were performed to verify the possibility of unfocussed beam forming. Finite element methods are based on a separate mathematical formulation. This formulation can be found in the manuals of the open-source software FEniCS, which was used to program the finite element simulations for this patent. The finite element formulation also involves time marching for which several schemes exist in literature. For the results presented herein, the time-marching scheme corresponds to the implicit Euler method, unless otherwise stated. The simulations performed thus far have verified the beam steering of only the $T_0$ mode. From the results in FIG. 27A, the displacement pattern for this mode is known to be predominantly axial for most of the helical angles. Therefore, the guided wave actuation mimicking that of FIG. 17 was used. The transducer array configuration similar to FIG. 23 was used. It may be noted that instead of a semi-circular pattern a fully circular pattern was used. The elements were arranged into a 4×16 grid (i.e., the flattened array including 4 elements along each radial row and 16 such rows along the tangential direction). The element diameter was maintained at $\frac{1}{16}$th of an inch. The elements were tightly packed in the radial direction. The small transducer size and spacing are beneficial so that plate guided wave beam forming theory may be adapted to approximately evaluate the phase delays. The frequency of excitation was maintained at 0.35 MHz. Snapshots of the finite element simulation are shown in FIGS. 28A and 28B for the helical angles of 45° and 60°, respectively, relative to the pipe axis. These results demonstrate that helical guided wave beams can be formed and steered. These results also partially confirm the theoretical predictions corresponding to FIG. 27A. Efforts to improve the computational speed and to test beam forming and steering for a greater range of helical angles is underway.

Summary of Select Disclosed Embodiments

The disclosed subject matter includes a method and a system for unfocused and focused beam forming and steering of ultrasonic guided waves in a pipe along helical path.

In one embodiment, a device includes an array of at least two ultrasonic transducers elements that can excite and receive sound or elastic waves in the pipe, or any implementation of such an array, exemplified by macro-fiber composites. The device includes an electronic system that can control or drive the ultrasonic transducer elements in the array. The control parameters may comprise one or more of the following: a continuously oscillating signal amplitude, a windowed pulsed signal comprising at least half an oscillation of any shape, signal whose frequency content may vary with time, a prescribed range of frequencies, varying time delays and/or amplitudes and/or number of cycles (or pulse length) and/or frequencies. In one embodiment, the device includes an optional array of at least one ultrasonic receiver. In another embodiment, the device includes an electronic system that can amplify and conditioning the signals received from each transmitting and/or receiving sensor.

In one embodiment, a method includes evaluation and selection of guided wave subtypes, helical paths and focal points enabled by new method of formulating guided waves in pipes. The above parameters are evaluated based on the above selection for electronically controlling the waves generated in the pipe. Detection of the defects and features in the pipe may be based on the presence or absence of anomalous signatures, such as reflections and transmissions of ultrasound from the defects. The features based on the amplitude distribution in time and/or frequency, arrival time and direction of approach of such signatures are mapped.

In one embodiment, a method for inspecting the pipe wherein the inspection includes detecting, locating and sizing flaws by processing the reflections resulting from beam formed waves that impinge on the flaws at multiple angles of incidence, where such reflections are received as signals by the above mentioned system of arrays and electronics. Further, the flaws may include a shape and/or orientation with a minimum size determined by the period or alternately the frequency of oscillation of the generated wave in time and space.

In one embodiment, a method for using special transducer array elements—that individually generate omnidirectional waves—whose configuration is determined by the direction of oscillation relative to the rays comprised by the propagating wave in the pipe or to the axis of the pipe. In some examples, the oscillation is one of: oscillation along the wall thickness of pipe using a traditional thickness mode piezo-electric transducer or specially shaped 1-3 piezo-composite; oscillation tangential and along the axis of the pipe using a circular shape macro-fiber composite with piezoelectric fibers oriented perpendicular to the axis and the electrodes arranged along the axis; oscillation tangential and orthogonal to the axis of the pipe using a macro-fiber composite that is circular in shape but the piezoelectric fibers are oriented along the axis of the pipe whereas the electrodes are oriented perpendicular to the axis; oscillation tangential but orthogonal to the rays comprised by the wave a circular shaped macro-fiber composite where the fibers form an annular array and the electrodes are oriented radially from the center of the annular array; oscillation tangential but parallel to the rays in the wave using a circular shaped macro-fiber composite where the electrodes form an annular array but the piezoelectric fibers are oriented radially from the center of the annular array; or other transduction mechanisms, such as electromagnetic acoustic transducers or magnetostrictive transducers.

In some embodiments, the devices disclosed herein are capable of generating both bidirectional and unidirectional beams. In some embodiments, the devices disclosed herein are capable of being used for focused beam forming and steering in plate-like structures. In some embodiments, the methods disclosed herein can also be used for post-processing ultrasonic radar data. In some embodiments, the devices disclosed herein can also be used for applications that require high intensity ultrasound, such as are nonlinear ultrasonic testing, ultrasonic deicing, ultrasonic cleaning, and processes involving sonochemistry.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method of inspecting a pipe for flaws comprising:
   emitting ultrasonic waves in a helical pattern through the pipe from an array of ultrasonic transducer elements, wherein individual ultrasonic transducer elements of the array comprise at least one ultrasonic emitter and at least one ultrasonic receiver, and wherein the at least one emitter is configured to emit omnidirectional ultrasonic waves;
   controlling the emission of the ultrasonic waves from the array such that a wave packet of the ultrasonic waves is emitted at a plurality of helical angles within a range of helical angles;
   receiving reflections of the ultrasonic waves, the reflections of the ultrasonic waves caused by impingement of the ultrasonic waves on one or more flaws; and
   determining at least one characteristic of the one or more flaws based on the received reflections of the ultrasonic waves based at least in part on the following formula:

$$\Phi = \varphi \Xi_\alpha$$

wherein $\Phi$ is a Helmholtz scalar potential;
   wherein $\Psi_r$, $\Psi_\theta$ and $\Psi_z$ are components of a Helmholtz vector potential;
   wherein $\varphi$, $\psi_{Tj}$; j=1,2 and $\psi_z$ are arbitrary constants; and
   wherein $\Xi_\eta$, $\eta=\alpha,\beta$ is a function of the form exp i ($\eta r \cos(\theta-\theta_n)+k_z z-\omega t$),
   wherein at least one ultrasonic transducer element is configured to produce a direction of oscillation relative to waves propagating in the pipe or to an axis of the pipe.

2. The method of claim 1, wherein the at least one characteristic of the one or more flaws comprises one or more of a location of the one or more flaws, a size of the one or more flaws, an orientation of the one or more flaws, or a shape of the one or more flaws.

3. The method of claim 1, wherein the at least one characteristic of the one or more flaws is determined based a presence or an absence of an anomalous signature, the method further comprising:
   mapping the at least one characteristic based on at least one of an amplitude distribution in time, an amplitude distribution in frequency, arrival time, or direction of approach of the anomalous signature.

4. The method of claim 1, further comprising:
   controlling one or more of an average value of the range of helical angles or a width of the range of helical angles.

5. The method of claim 1, wherein the direction of oscillation is along a thickness of the pipe, and wherein the at least one ultrasonic transducer element is a thickness mode piezoelectric transducer or a particularly-shaped 1-3 piezo-composite transducer.

6. The method of claim 1, wherein the direction of oscillation is along the axis of the pipe, and wherein the at least one ultrasonic transducer element is a circular-shaped macro-fiber composite with piezoelectric fibers oriented perpendicular to the axis and comprises electrodes arranged along the axis of the pipe.

7. The method of claim 1, wherein the direction of oscillation is tangential to a surface of the pipe and orthogonal to the axis of the pipe, and wherein the at least one ultrasonic transducer element is a circular-shaped macro-fiber composite with piezoelectric fibers oriented perpendicular to the axis and comprises electrodes arranged perpendicular to the axis of the pipe.

8. The method of claim 1, wherein the direction of oscillation is tangential to a surface of the pipe and orthogonal to the waves, and wherein the at least one ultrasonic transducer element is a circular-shaped macro-fiber composite with piezoelectric fibers forming an annular array and comprises electrodes oriented radially from the center of the annular array.

9. The method of claim 1, wherein the direction of oscillation is tangential to a surface of the pipe and parallel to the waves, and wherein the at least one ultrasonic transducer element comprises electrodes forming an annular array, and wherein the at least one ultrasonic transducer element is a circular-shaped macro-fiber composite with piezoelectric fibers oriented radially from the center of the annular array.

10. The method of claim 1, further comprising determining at least one characteristic of one or more flaws in the structure based at least in part on a time delay supplemented by amplitude control based on a minimum time delay increment, and wherein the minimum time delay is a characteristic of hardware in the device.

11. A device for inspecting a structure for flaws, the device comprising:
    at least one ultrasonic emitter configured to emit waves in the structure, wherein the structure is a pipe;
    at least one ultrasonic receiver configured to receive reflections of the waves caused by impingement of the waves on one or more flaws; and
    a computing system configured to:
      control emission of waves from at least one ultrasonic transducer element in helical patterns based on one or more control parameters, the one or more control parameters comprising at least a windowed pulsed signal comprising at least a half oscillation of any shape;
      determine at least one characteristic of one or more flaws in the structure based on the signals emitted from an array of ultrasonic transducer elements and the reflections of the waves received by the array of ultrasonic transducer elements; and
      determine at least one characteristic of one or more flaws in the structure based at least in part on a time delay supplemented by amplitude control based on a minimum time delay increment, wherein the minimum time delay is a characteristic of hardware in the device;
    wherein at least one emitter is configured to emit omnidirectional ultrasound waves, wherein at least one ultrasonic transducer element comprises the at least one ultrasonic emitter and the at least one ultrasonic receiver, and wherein the at least one ultrasonic transducer element is configured to produce a direction of oscillation relative to waves propagating in the pipe or to an axis of the pipe.

12. The device of claim 11, wherein the one or more control parameters further comprise at least one of:
    a continuous oscillation of signal amplitudes;
    a variance of signal frequency over time;
    a prescribed range of frequencies; or
    a variance of one or more of time delays, amplitudes, number cycles, pulse lengths, or frequencies.

13. The device of claim 12, further comprising:
    at least one additional ultrasonic receiver configured to receive one or more of the waves emitted by the array or the reflections of the waves, wherein the at least one additional ultrasonic receiver is separate from the array; wherein the computing system is further configured to determine the at least one characteristic of the one or more flaws based on the characteristics of reflected or transmission of waves received by the at least one additional ultrasonic receiver.

14. The device of claim 11, wherein the computing system is configured to evaluate and select one or more of a guided wave subtype of the waves, helical paths of the waves, or a focal point of the waves.

15. The device of claim 11, wherein the pipe comprises at least one of a circular cross-section, a square cross-section, a triangular cross-section, any other polygonal cross-section, or a cross-section that rotates along the axis of the pipe.

16. The device of claim 11, wherein the direction of oscillation is along a thickness of the pipe, and wherein the at least one ultrasonic transducer element is a thickness mode piezoelectric transducer or a particularly-shaped 1-3 piezo-composite transducer.

17. The device of claim 11, wherein the direction of oscillation is along the axis of the pipe, and wherein the at least one ultrasonic transducer element is a circular-shaped macro-fiber composite with piezoelectric fibers oriented perpendicular to the axis and comprises electrodes arranged along the axis of the pipe.

18. The device of claim 11, wherein the direction of oscillation is tangential to a surface of the pipe and orthogonal to the axis of the pipe, and wherein the at least one ultrasonic transducer element is a circular-shaped macro-fiber composite with piezoelectric fibers oriented perpendicular to the axis and comprises electrodes arranged perpendicular to the axis of the pipe.

19. The device of claim 11, wherein the direction of oscillation is tangential to a surface of the pipe and orthogonal to the waves, and wherein the at least one ultrasonic transducer element is a circular-shaped macro-fiber composite with piezoelectric fibers forming an annular array and comprises electrodes oriented radially from the center of the annular array.

20. The device of claim 11, wherein the direction of oscillation is tangential to a surface of the pipe and parallel to the waves, and wherein the at least one ultrasonic transducer element comprises electrodes forming an annular array, and wherein the at least one ultrasonic transducer element is a circular-shaped macro-fiber composite with piezoelectric fibers oriented radially from the center of the annular array.

21. The device of claim 11, wherein the at least one ultrasonic emitter is configured to emit waves both unidirectionally and bidirectionally.

22. The device of claim 11, wherein the computing system is further configured to determine at least one characteristic of one or more flaws in the structure based at least in part on the following formula:

$$\Phi = \phi \Xi_\alpha$$

$$\begin{bmatrix} \Psi_r \\ \Psi_\theta \\ \Psi_z \end{bmatrix} = \begin{bmatrix} \psi_{T1} & \psi_{T2} & 0 \\ -\psi_{T2} & \psi_{T1} & 0 \\ 0 & 0 & \psi_z \end{bmatrix} \begin{bmatrix} \partial \Xi_\beta / \partial r \\ \dfrac{1}{r} \dfrac{\partial \Xi_\beta}{\partial \theta} \\ \Xi_\beta \end{bmatrix}$$

wherein $\Phi$ is a Helmholtz scalar potential;
wherein $\Psi_r$, $\Psi_\theta$ and $\Psi_z$ are components of a Helmholtz vector potential;
wherein $\varphi$, $\psi_{Tj}$; j=1, 2 and $\psi_z$ are arbitrary constants; and
wherein $\Xi_\eta$, $\eta=\alpha,\beta$ is a function of the form exp i ($\eta$r cos $(\theta-\theta_\eta)+k_z z-\omega t$).

23. The device of claim 11, wherein the pipe is a bent pipe.

24. The device of claim 11, wherein the computing system is configured to process received data from independent actuation of the array of ultrasonic transducer elements to mimic effects of real beam forming.

* * * * *